US011920553B2

(12) United States Patent
Harada et al.

(10) Patent No.: US 11,920,553 B2
(45) Date of Patent: Mar. 5, 2024

(54) HYDROELECTRIC POWER GENERATION SYSTEM

(71) Applicant: DAIKIN INDUSTRIES, LTD., Osaka (JP)

(72) Inventors: Yoshiyuki Harada, Osaka (JP); Atsushi Suhara, Osaka (JP); Takao Sonoda, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/721,812

(22) Filed: Apr. 15, 2022

(65) Prior Publication Data
US 2022/0235733 A1 Jul. 28, 2022

Related U.S. Application Data

(63) Continuation of application No. PCT/JP2020/038364, filed on Oct. 9, 2020.

(30) Foreign Application Priority Data

Oct. 17, 2019 (JP) ................................. 2019-190186

(51) Int. Cl.
F03B 15/16 (2006.01)
H02K 7/18 (2006.01)

(52) U.S. Cl.
CPC .......... F03B 15/16 (2013.01); H02K 7/1823 (2013.01); F05B 2220/20 (2013.01); F05B 2220/706 (2013.01); F05B 2270/301 (2013.01); F05B 2270/34 (2020.08); F05B 2270/341 (2020.08)

(58) Field of Classification Search
CPC ....... F03B 15/16; F03B 15/08; H02K 7/1823; F05B 2220/20; F05B 2220/706; F05B 2270/301; F05B 2270/34; F05B 2270/341
See application file for complete search history.

(56) References Cited

U.S. PATENT DOCUMENTS 4,109,160 A 8/1978 Goto et al.
2019/0331086 A1 10/2019 Abe et al.

FOREIGN PATENT DOCUMENTS

EP 3 496 263 A1 6/2019
EP 3 553 305 A1 10/2019
JP 2016-86480 A 5/2016
(Continued)

OTHER PUBLICATIONS

International Search Report of corresponding PCT Application No. PCT/JP2020/038364 dated Dec. 1, 2020.
(Continued)

Primary Examiner — Joseph Ortega
(74) Attorney, Agent, or Firm — Global IP Counselors, LLP

(57) ABSTRACT

A hydroelectric power generation system includes a water turbine disposed in a channel that carries a flow of a fluid, a generator driven by the water turbine, and a controller that performs a first control. The channel includes a first channel located on an inflow side of the water turbine. The controller controls, in the first control, a flow rate or a head of the water turbine so that any one of a pressure of the fluid in the first channel, a flow rate of the fluid in the first channel, and a liquid level of the fluid in a first reservoir from which the fluid flows out to the first channel approaches a first target value.

13 Claims, 20 Drawing Sheets

(56) References Cited

FOREIGN PATENT DOCUMENTS

| JP | 2018-119409 A |   | 8/2018 |
|----|---------------|---|--------|
| JP | 2018-119547 A |   | 8/2018 |
| JP | 2018119409 A  | * | 8/2018 |
| JP | 2019-20191 A  |   | 2/2019 |

OTHER PUBLICATIONS

International Preliminary Report of corresponding PCT Application No. PCT/JP2020/038364 dated Apr. 28, 2022.
European Search Report of corresponding EP Application No. 20 87 6020.7 dated Nov. 20, 2023.

* cited by examiner

HYDROELECTRIC POWER GENERATION SYSTEM

CROSS-REFERENCE TO RELATED APPLICATIONS

This is a continuation of International Application No. PCT/JP2020/038364 filed on Oct. 9, 2020, which claims priority to Japanese Patent Application No. 2019-190186, filed on Oct. 17, 2019. The entire disclosures of these applications are incorporated by reference herein.

BACKGROUND

Technical Field

The present disclosure relates to a hydroelectric power generation system.

Background Art

Japanese Unexamined Patent Application Publication No. 2018-119547 discloses a hydroelectric power generation system. The hydroelectric power generation system includes a water turbine disposed in a channel through which a fluid flows, a generator driven by the water turbine, head adjustment means for adjusting an effective head of the water turbine, and a control unit. The control unit performs, in a collaborative manner, flow rate control of controlling the generator so that the flow rate of the water turbine approaches a target flow rate, and head adjustment control of adjusting the effective head of the water turbine by the head adjustment means so that the effective head of the water turbine is within a first range.

SUMMARY

A first aspect of the present disclosure relates to a hydroelectric power generation system. The hydroelectric power generation system includes a water turbine disposed in a channel configured to carry a flow of a fluid therethrough, a generator configured to be driven by the water turbine, and a controller configured to perform a first control. The channel includes a first channel located on an inflow side of the water turbine. The controller is configured to control, in the first control, a flow rate or a head of the water turbine so that any one of a pressure of the fluid in the first channel, a flow rate of the fluid in the first channel, and a liquid level of the fluid in a first reservoir from which the fluid flows out to the first channel approaches a first target value.

DETAILED DESCRIPTION OF EMBODIMENT(S)

Figure 1:
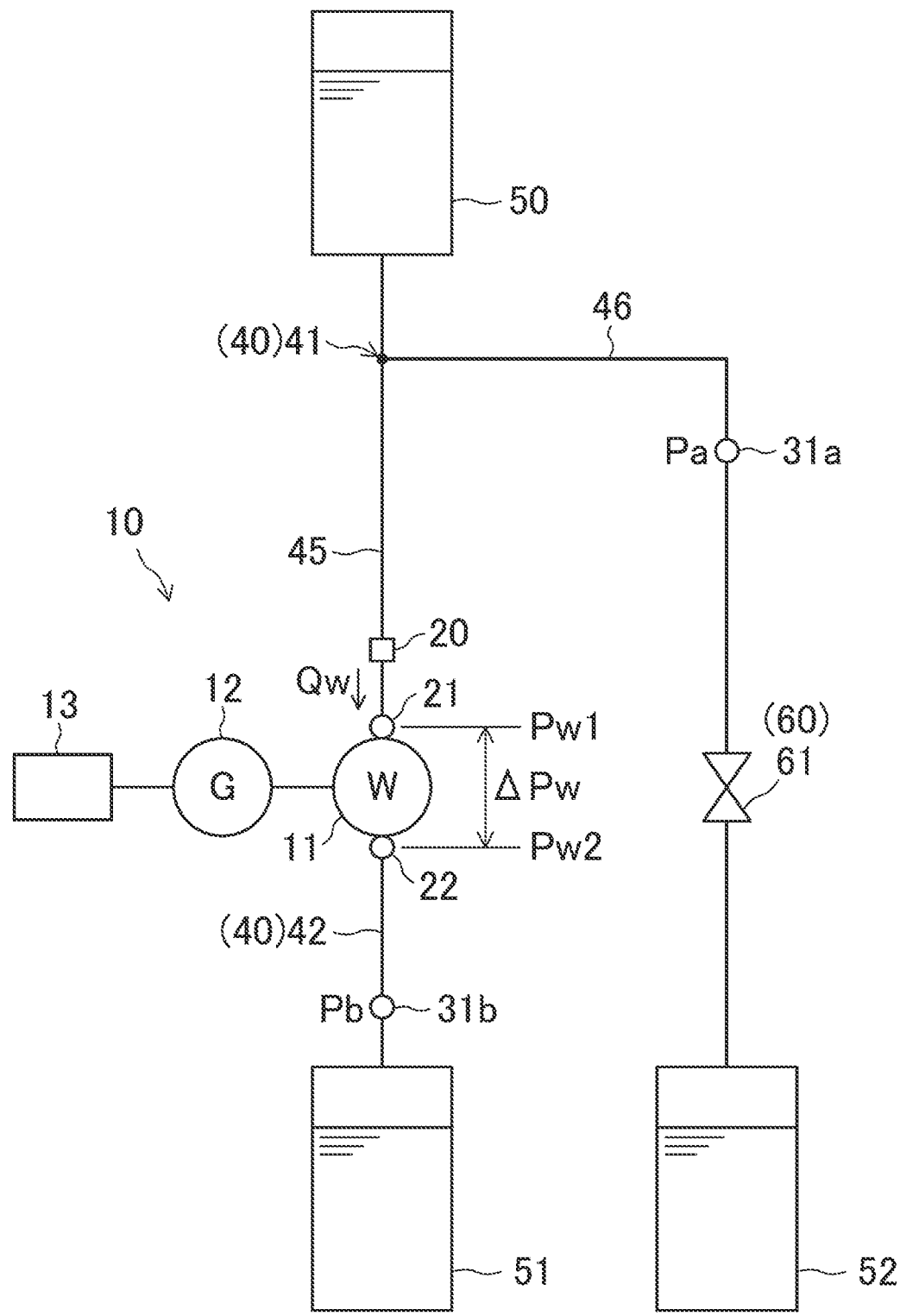
FIG. 1 is a diagram illustrating the configuration of a channel provided with a hydroelectric power generation system according to Embodiment 1.

Hereinafter, embodiments will be described in detail with reference to the drawings. In the drawings, the same or corresponding parts are denoted by the same reference numerals, and the description thereof is not repeated.

Embodiment 1

FIG. 1 illustrates the configuration of a channel (40) provided with a hydroelectric power generation system (10) according to Embodiment 1. The hydroelectric power generation system (10) includes a water turbine (11), a generator (12), and a controller (13). The water turbine (11) is disposed in the channel (40).

Channel

The channel (40) has a head. A fluid (for example, water) flows through the channel (40). The channel (40) includes a first channel (41) and a second channel (42). For example, the channel (40) is formed of a plurality of metal pipes (for example, ductile iron pipes). In this example, the channel (40) is provided with a first reservoir (50), a second reservoir (51), and a branch reservoir (52). From the first reservoir (50), a fluid flows out to the first channel (41). The second reservoir (51) receives a fluid from the second channel (42).

First Channel

The first channel (41) is a channel located on an inflow side of the water turbine (11). In this example, the first channel (41) includes a water turbine channel (45) and a branch channel (46). The water turbine channel (45) is a channel that connects the first reservoir (50) and the water turbine (11). At least part of a fluid that is to flow into the water turbine (11) flows through the water turbine channel (45). The branch channel (46) is a channel that branches from the water turbine channel (45). In this example, the branch channel (46) is formed of a single channel. An outlet of the branch channel (46) is connected to the branch reservoir (52).

Second Channel

The second channel (42) is a channel located on an outflow side of the water turbine (11). In this example, the second channel (42) is formed of a single channel. An outlet of the second channel (42) is connected to the second reservoir (51).

Water Turbine

The water turbine (11) is disposed in the channel (40). In this example, the water turbine (11) includes an impeller and a casing accommodating the impeller. For example, an impeller equipped in a volute pump is used as the impeller. The impeller has a shaft fixed to the center portion thereof. In the water turbine (11), a flow of a fluid that has flowed into the casing through an inlet (inflow port) formed in the casing causes the impeller to rotate upon receipt of a pressure, and the shaft rotates in accordance with the rotation of the impeller. The fluid in the casing is discharged through an outlet (outflow port) formed in the casing.

Generator

The generator (12) is driven by the water turbine (11). Specifically, the generator (12) is coupled to the shaft of the water turbine (11) and is driven to rotate. The generator (12) generates power by being driven to rotate. For example, the generator (12) includes a permanent-magnet-embedded roller and a stator having a coil.

Flowmeter

In this example, the water turbine channel (45) is provided with a flowmeter (20). The flowmeter (20) is disposed, in the water turbine channel (45), between the water turbine (11) and a connection point between the water turbine channel (45) and the branch channel (46). The flowmeter (20) detects a flow rate (Qw) of the water turbine (11) (specifically, a flow rate (Qw) of a fluid flowing through the water turbine (11)). The flowmeter (20) then transmits a detection signal indicating a detection result (the flow rate (Qw) of the fluid) to the controller (13).

Pressure Sensors

In this example, a primary-side pressure sensor (21) and a secondary-side pressure sensor (22) are provided. In this example, the primary-side pressure sensor (21) is disposed at an inlet of the water turbine (11), and the secondary-side pressure sensor (22) is disposed at an outlet of the water turbine (11).

Primary-Side Pressure Sensor

The primary-side pressure sensor (21) detects a pressure (Pw1) of a fluid near the inlet of the water turbine (11). In other words, the primary-side pressure sensor (21) detects the pressure (Pw1) of the fluid that flows into the water turbine (11). The primary-side pressure sensor (21) then transmits a detection signal indicating a detection result (the pressure (Pw1) of the fluid) to the controller (13).

Secondary-Side Pressure Sensor

The secondary-side pressure sensor (22) detects a pressure (Pw2) of a fluid near the outlet of the water turbine (11). In other words, the secondary-side pressure sensor (22) detects the pressure (Pw2) of the fluid that flows out from the water turbine (11). The secondary-side pressure sensor (22) then transmits a detection signal indicating a detection result (the pressure (Pw2) of the fluid) to the controller (13).

First Pressure Sensor

In this example, the first channel (41) is provided with a first pressure sensor (31a). The first pressure sensor (31a) detects a pressure (Pa) of a fluid in the first channel (41). The first pressure sensor (31a) then transmits a detection signal indicating a detection result (the pressure (Pa) of the fluid in the first channel (41)) to the controller (13). In this example, the first pressure sensor (31a) is provided in the branch channel (46), which is part of the first channel (41).

Second Pressure Sensor

In this example, the second channel (42) is provided with a second pressure sensor (31b). The second pressure sensor (31b) detects a pressure (Pb) of a fluid in the second channel (42). The second pressure sensor (31b) then transmits a detection signal indicating a detection result (the pressure (Pb) of the fluid in the second channel (42)) to the controller (13).

Adjustment Mechanism

In this example, the branch channel (46) is provided with an adjustment mechanism (60). The adjustment mechanism (60) adjusts the flow rate or pressure of a fluid. In this example, the adjustment mechanism (60) is a manual valve (61). The opening degree of the manual valve (61) may be fixed or variable.

Controller

The controller (13) is connected to individual parts of the hydroelectric power generation system (10) by signal lines, and controls the individual parts of the hydroelectric power generation system (10) on the basis of signals received from the individual parts of the hydroelectric power generation system (10) (for example, detection signals of various sensors), an instruction from the outside (for example, a target value), and the like.

The controller (13) controls a flow rate (Qw) or a head (ΔPw) of the water turbine (11). Specifically, the controller (13) controls a torque or the number of rotations of the generator (12) to control the flow rate (Qw) or the head (ΔPw) of the water turbine (11). The controller (13) is capable of operating by using power obtained by the generator (12).

In this example, the controller (13) is capable of performing first control and second control. For example, the controller (13) switches between the first control and the second control in response to an instruction from the outside.

In Embodiment 1, the controller (13) controls, in the first control, the flow rate (Qw) or the head (ΔPw) of the water turbine (11) so that the pressure (Pa) of the fluid in the first channel (41) approaches a first target value. The controller (13) controls, in the second control, the flow rate (Qw) or the head (ΔPw) of the water turbine (11) so that the pressure (Pb) of the fluid in the second channel (42) approaches a second target value. The first control and the second control will be described in detail below.

Configuration of Controller

Figure 2:
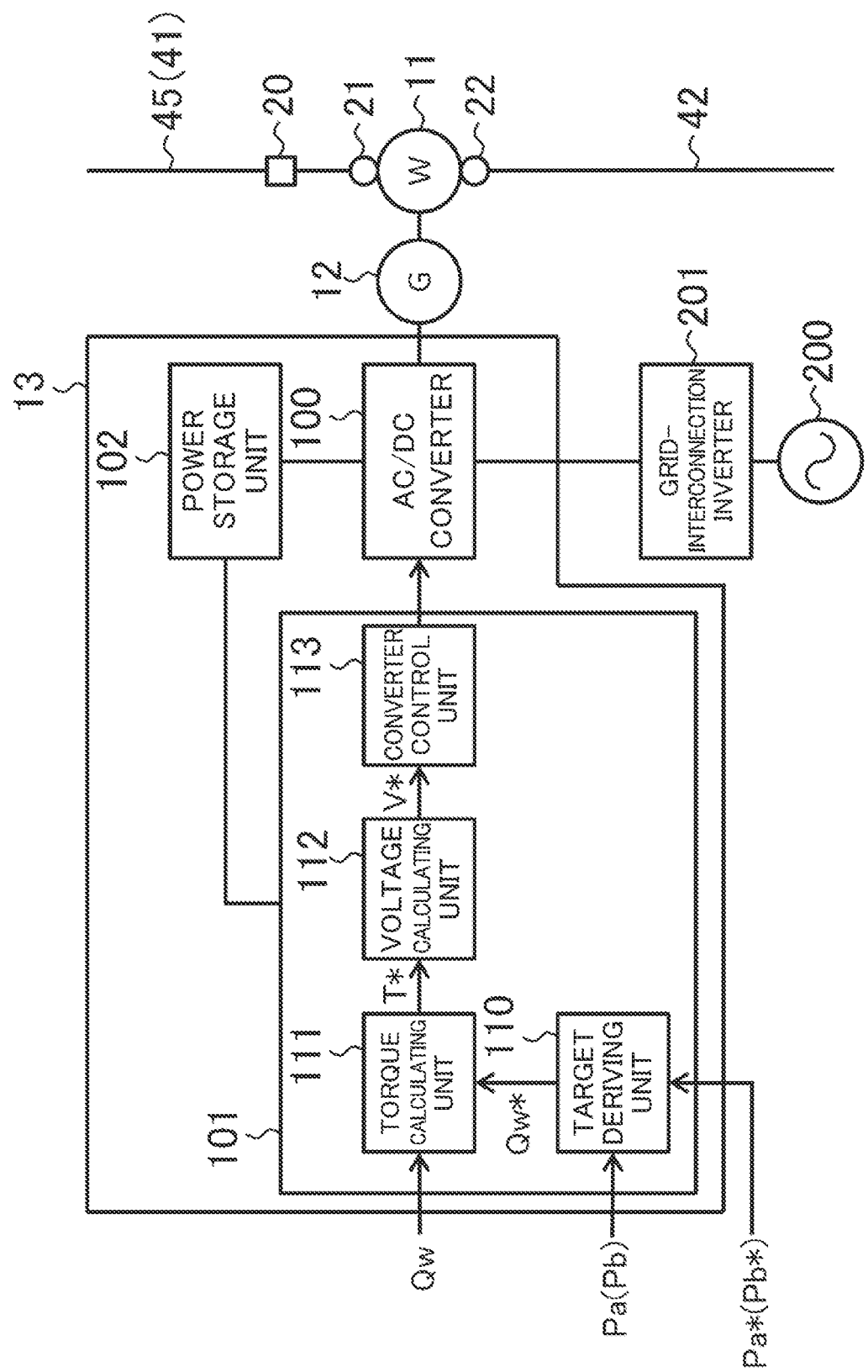
FIG. 2 is a block diagram illustrating the configuration of a controller.

FIG. 2 illustrates the configuration of the controller (13). FIG. 2 illustrates the configuration of the controller (13) that controls the torque of the generator (12) to control the flow rate (Qw) of the water turbine (11). The controller (13) includes an AC/DC converter (100), a generator control unit (101), and a power storage unit (102).

AC/DC Converter

The AC/DC converter (100) includes a plurality of switching elements, and converts power (AC power) obtained from power generation by the generator (12) into DC power by switching operations. An output of the AC/DC converter (100) is smoothed by a smoothing capacitor and is output to a grid-interconnection inverter (201).

Grid-Interconnection Inverter

The grid-interconnection inverter (201) includes a plurality of switching elements constituting an inverter unit. The grid-interconnection inverter (201) receives DC power from the AC/DC converter (100). In the grid-interconnection inverter (201), the DC power is converted into AC power by switching operations of the plurality of switching elements. The AC power generated by the grid-interconnection inverter (201) is supplied to a power system (200). For example, the power system (200) is a so-called commercial power system. In the hydroelectric power generation system (10), so-called selling electricity is performed by supplying power to the commercial power system (so-called reverse power flow).

Generator Control Unit

The generator control unit (101) is constituted by, for example, a processor and a memory that stores a program and information for operating the processor. In this example, the generator control unit (101) includes a target deriving unit (110), a torque calculating unit (111), a voltage calculating unit (112), and a converter control unit (113).

Target Deriving Unit

In first control, the target deriving unit (110) receives a pressure (Pa) of a fluid in the first channel (41) and a first target pressure (Pa*) (an example of the first target value) corresponding to a target value of the pressure (Pa) in the first control. The target deriving unit (110) derives a flow rate command value (Qw*) corresponding to a target value of the flow rate (Qw) of the water turbine (11) so that the pressure (Pa) of the fluid in the first channel (41) approaches the first target pressure (Pa*).

In second control, the target deriving unit (110) receives a pressure (Pb) of a fluid in the second channel (42) and a second target pressure (Pb*) corresponding to a target value of the pressure (Pb) in the second control. The target deriving unit (110) derives a flow rate command value (Qw*) so that the pressure (Pb) of the fluid in the second channel (42) approaches the second target pressure (Pb*).

Torque Calculating Unit

The torque calculating unit (111) receives the flow rate (Qw) of the water turbine (11) and the flow rate command value (Qw*) derived by the target deriving unit (110). The torque calculating unit (11) derives a torque command value (T*) corresponding to a target value of the torque of the generator (12) so that the flow rate (Qw) of the water turbine (11) approaches the flow rate command value (Qw*).

Voltage Calculating Unit

The voltage calculating unit (112) receives the torque command value (T*) derived by the torque calculating unit (111). The voltage calculating unit (112) derives a voltage command value (V*) on the basis of the torque command value (T*).

Converter Control Unit

The converter control unit (113) performs pulse width modulation (PWM) control on the switching elements of the AC/DC converter (100) on the basis of the voltage command value (V*) derived by the voltage calculating unit (112). This makes it possible to cause the flow rate (Qw) of the water turbine (11) to approach the flow rate command value (Qw*).

Power Storage Unit

The power storage unit (102) stores power obtained from power generation by the generator (12). In this example, the power storage unit (102) receives DC power from the AC/DC converter (100). The generator control unit (101) is capable of operating by using the power stored in the power storage unit (102).

Operation Parameters of Hydroelectric Power Generation System

Next, with reference to FIG. 3, operation parameters of the hydroelectric power generation system (10) and the relationships therebetween will be described in detail. In the graph illustrated in FIG. 3 (also referred to as a characteristic map (M)), the vertical axis indicates an effective head (H) of the water turbine (11), and the horizontal axis indicates a flow rate (Q) of the water turbine (11). Here, the effective head (H) of the water turbine (11) is obtained by subtracting a head corresponding to a pipeline resistance for the fluid in the first reservoir (50) flowing through the channel (40) to reach the second reservoir (51), from a total head (Ho) between a liquid surface of the first reservoir (50) and a liquid surface of the second reservoir (51).

Figure 3:
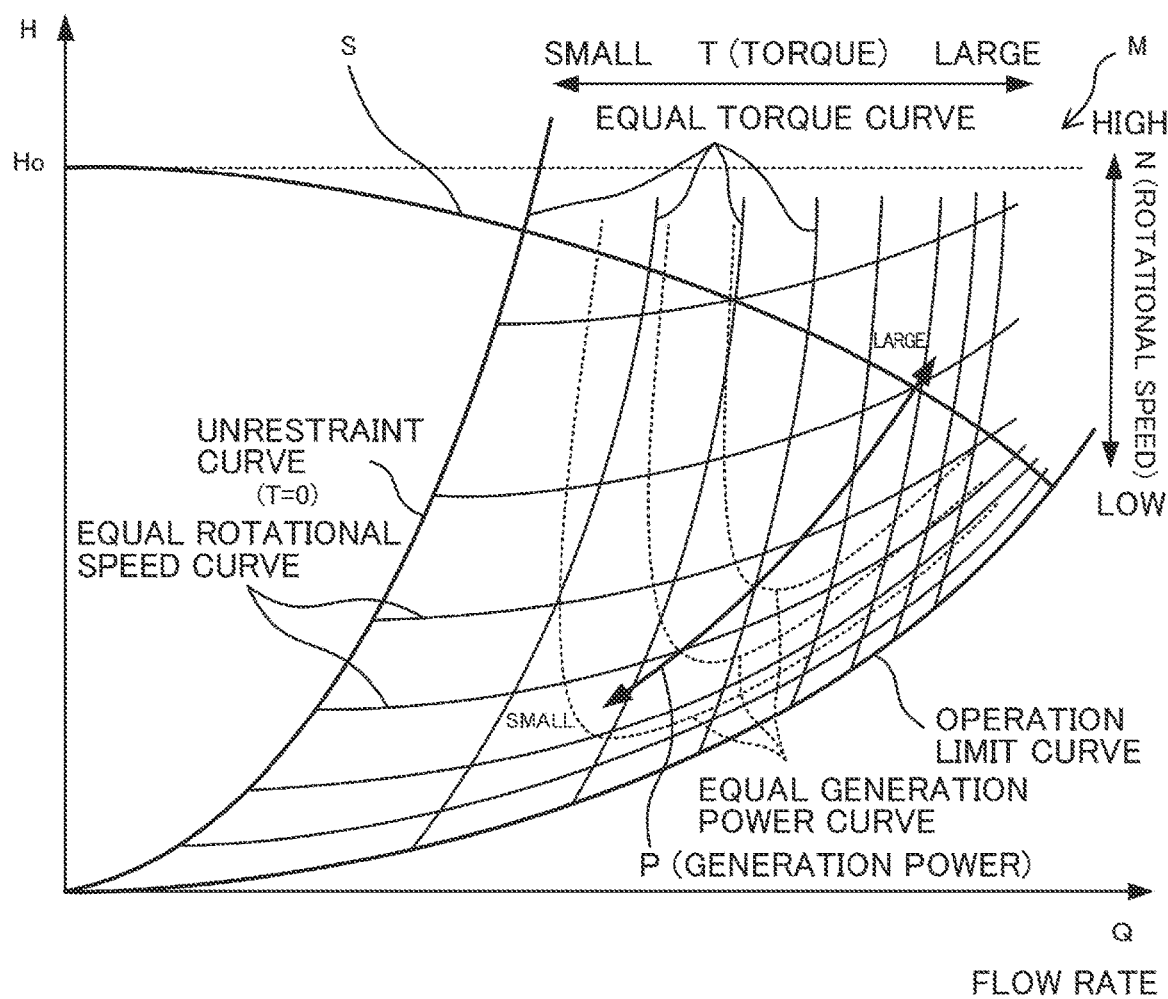
FIG. 3 is a graph illustrating a characteristic map of the hydroelectric power generation system.

The relationship between the effective head (H) and the flow rate (Q) can be represented by a flow resistance characteristic line (also referred to as a system loss curve (S)) illustrated in FIG. 3. In the system loss curve (S), the effective head (H) when the flow rate (Q) is 0 is the total head (Ho). The system loss curve (S) has a characteristic that the effective head (H) decreases to draw a quadric curve as the flow rate (Q) increases. The curvature of the system loss curve (S) has a value unique to the channel (40) in FIG. 1. The flow rate (Q) in the channel (40) including the hydroelectric power generation system (10) and the effective head (H) thereof correspond to a point on the system loss curve (S). That is, the point corresponding to the flow rate (Q) and the effective head (H) of the water turbine (11) (an operation point of the water turbine (11)) is always on the system loss curve (S).

The characteristic map (M) in FIG. 3 shows a torque value (T) of the generator (12), the number of rotations (rotational speed) (N) of the generator (12), and a generation power (P) of the generator (12), as characteristics correlated with the flow rate (Q) and the effective head (H) of the water turbine (11).

The characteristic map (M) has a region in which the water turbine (11) is capable of operating (referred to as a water turbine region or an operable region), formed between a curve in which the torque value (T) of the generator (12) is 0 (referred to as an unrestraint curve (T=0)) and a curve in which the number of rotations (N) of the generator (12) is 0 or a predetermined minimum number of rotations (referred to as an operation limit curve). In FIG. 3, the region on the left side of the unrestraint curve is a water turbine brake region (powering region).

In the water turbine region, a plurality of equal torque curves are along the unrestraint curve, and the torque value (T) increases as the flow rate (Q) increases on the characteristic map (M). A plurality of equal rotational speed curves are along the operation limit curve, and the number of rotations (N) increases as the effective head (H) increases. In the system loss curve (S), the torque value (T) decreases as the flow rate (Q) decreases. In the system loss curve (S), the number of rotations (N) decreases as the flow rate (Q) increases. Equal generation power curves represented by broken lines are downward convex curves, and the generation power (P) increases as the effective head (H) and the flow rate (Q) increase.

The above-described relationships between the individual parameters on the characteristic map (M) can be stored in a memory device in the form of a table (numerical table) or a mathematical expression (function) in a program. Thus, the controller (13) is capable of performing various types of calculation and control by using the relationships between the individual parameters shown in the characteristic map (M).

First Control (Flow Rate Control)

Next, first control by the controller (13) in Embodiment 1 will be described with reference to FIG. 4. Hereinafter, a description will be given of, as an example, a case in which flow rate control (control of the flow rate (Qw) of the water turbine (11)) is performed in the first control.

Step (ST11)

The controller (13) determines whether the pressure (Pa) of the fluid in the first channel (41) is above the first target pressure (Pa*). For example, the determination is performed by the target deriving unit (110). If the pressure (Pa) of the fluid in the first channel (41) is above the first target pressure (Pa*), the operation of step (ST13) is performed. Otherwise, the operation of step (ST12) is performed.

Step (ST12)

The controller (13) determines whether the pressure (Pa) of the fluid in the first channel (41) is below the first target pressure (Pa*). For example, the determination is performed by the target deriving unit (110). If the pressure (Pa) of the fluid in the first channel (41) is below the first target pressure (Pa*), the operation of step (ST14) is performed. Otherwise, the operation of step (ST15) is performed.

Step (ST13)

If the pressure (Pa) of the fluid in the first channel (41) is above the first target pressure (Pa*), the controller (13) increases the flow rate (Qw) of the water turbine (11). For example, the target deriving unit (110) increases the flow rate command value (Qw*). As a result of increasing the flow rate (Qw) of the water turbine (11) in this manner, the pressure (Pa) of the fluid in the first channel (41) decreases, and the pressure (Pa) of the fluid in the first channel (41) approaches the first target pressure (Pa*).

Step (ST14)

If the pressure (Pa) of the fluid in the first channel (41) is below the first target pressure (Pa*), the controller (13) decreases the flow rate (Qw) of the water turbine (11). For example, the target deriving unit (110) decreases the flow rate command value (Qw*). As a result of decreasing the flow rate (Qw) of the water turbine (11) in this manner, the pressure (Pa) of the fluid in the first channel (41) increases, and the pressure (Pa) of the fluid in the first channel (41) approaches the first target pressure (Pa*).

Step (ST15)

If the pressure (Pa) of the fluid in the first channel (41) matches the first target pressure (Pa*), the controller (13) maintains the flow rate (Qw) of the water turbine (11). For example, the target deriving unit (110) maintains the flow rate command value (Qw*) without changing it. As a result of maintaining the flow rate (Qw) of the water turbine (11) in this manner, the pressure (Pa) of the fluid in the first channel (41) is maintained.

Second Control (Flow Rate Control)

Next, second control by the controller (13) in Embodiment 1 will be described with reference to FIG. 5. Hereinafter, a description will be given of, as an example, a case in which flow rate control (control of the flow rate (Qw) of the water turbine (11)) is performed in the second control.

Step (ST21)

The controller (13) determines whether the pressure (Pb) of the fluid in the second channel (42) is above the second target pressure (Pb*). For example, the determination is performed by the target deriving unit (110). If the pressure (Pb) of the fluid in the second channel (42) is above the second target pressure (Pb*), the operation of step (ST23) is performed. Otherwise, the operation of step (ST22) is performed.

Step (ST22)

The controller (13) determines whether the pressure (Pb) of the fluid in the second channel (42) is below the second target pressure (Pb*). For example, the determination is performed by the target deriving unit (110). If the pressure (Pb) of the fluid in the second channel (42) is below the second target pressure (Pb*), the operation of step (ST24) is performed. Otherwise, the operation of step (ST25) is performed.

Step (ST23)

If the pressure (Pb) of the fluid in the second channel (42) is above the second target pressure (Pb*), the controller (13) decreases the flow rate (Qw) of the water turbine (11). For example, the target deriving unit (110) decreases the flow rate command value (Qw*). As a result of decreasing the flow rate (Qw) of the water turbine (11) in this manner, the pressure (Pb) of the fluid in the second channel (42) decreases, and the pressure (Pb) of the fluid in the second channel (42) approaches the second target pressure (Pb*).

Step (ST24)

If the pressure (Pb) of the fluid in the second channel (42) is below the second target pressure (Pb*), the controller (13) increases the flow rate (Qw) of the water turbine (11). For example, the target deriving unit (110) increases the flow rate command value (Qw*). As a result of increasing the flow rate (Qw) of the water turbine (11) in this manner, the pressure (Pb) of the fluid in the second channel (42) increases, and the pressure (Pb) of the fluid in the second channel (42) approaches the second target pressure (Pb*).

Step (ST25)

If the pressure (Pb) of the fluid in the second channel (42) matches the second target pressure (Pb*), the controller (13) maintains the flow rate (Qw) of the water turbine (11). For example, the target deriving unit (110) maintains the flow rate command value (Qw*) without changing it. As a result of maintaining the flow rate (Qw) of the water turbine (11) in this manner, the pressure (Pb) of the fluid in the second channel (42) is maintained.

Head Control

The controller (13) may be configured to control the torque of the generator (12) to control the head ($\Delta$Pw) of the water turbine (11) (specifically, the pressure difference of a fluid between the inlet and the outlet of the water turbine (11)). For example, the target deriving unit (110) may derive a head command value corresponding to a target value of the head ($\Delta$Pw) of the water turbine (11) so that the pressure (Pa) of the fluid in the first channel (41) approaches the first target pressure (Pa*). The torque calculating unit (111) may derive a torque command value (T*) so that the head ($\Delta$Pw) of the water turbine (11) approaches the head command value.

First Control (Head Control)

Next, with reference to FIG. 6, a description will be given of a case in which head control (control of the head ($\Delta$Pw) of the water turbine (11)) is performed in the first control by the controller (13) of Embodiment 1. Hereinafter, a description will be given of, as an example, the case of controlling the pressure (Pw2) of the fluid near the outlet of the water turbine (11) to control the head ($\Delta$Pw) of the water turbine (11). Specifically, the target deriving unit (110) derives a pressure command value, which is a target value of the pressure (Pw2) of the fluid near the outlet of the water turbine (11), so that the pressure (Pa) of the fluid in the first channel (41) approaches the first target pressure (Pa*). The torque calculating unit (111) derives a torque command value (T*) so that the pressure (Pw2) of the fluid near the outlet of the water turbine (11) approaches the pressure command value.

Step (ST11)

Figure 4:
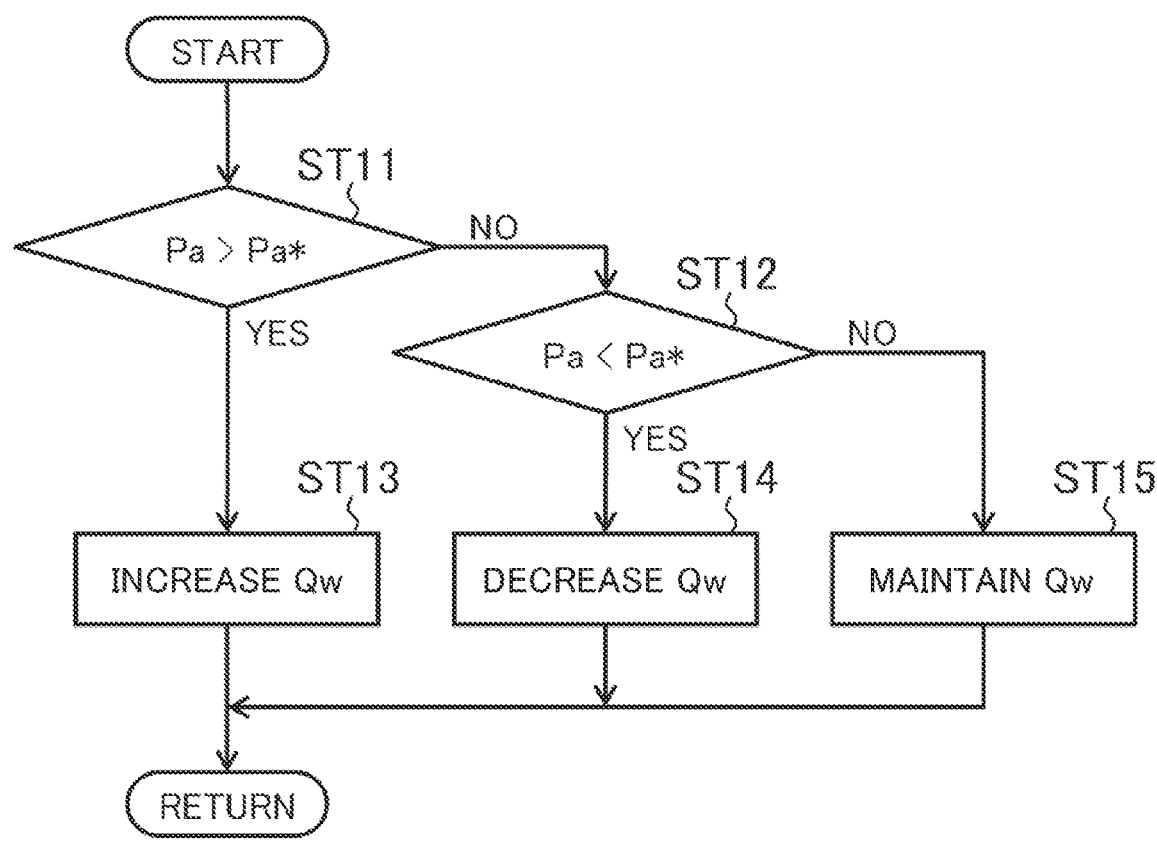
FIG. 4 is a flowchart illustrating first control (flow rate control) in Embodiment 1.

As in the first control illustrated in FIG. 4, the operation of step (ST11) is performed. If the pressure (Pa) of the fluid in the first channel (41) is above the first target pressure (Pa*), the operation of step (ST16) is performed. Otherwise, the operation of step (ST12) is performed.

Step (ST12)

As in the first control illustrated in FIG. 4, the operation of step (ST12) is performed. If the pressure (Pa) of the fluid in the first channel (41) is below the first target pressure (Pa*), the operation of step (ST17) is performed. Otherwise, the operation of step (ST18) is performed.

Step (ST16)

If the pressure (Pa) of the fluid in the first channel (41) is above the first target pressure (Pa*), the controller (13) increases the pressure (Pw2) of the fluid near the outlet of the water turbine (11). For example, the target deriving unit (110) increases the pressure command value. As a result of increasing the pressure (Pw2) of the fluid near the outlet of the water turbine (11) (decreasing the head (ΔPw) of the water turbine (11)) in this manner, the pressure (Pa) of the fluid in the first channel (41) decreases, and the pressure (Pa) of the fluid in the first channel (41) approaches the first target pressure (Pa*).

Step (ST17)

If the pressure (Pa) of the fluid in the first channel (41) is below the first target pressure (Pa*), the controller (13) decreases the pressure (Pw2) of the fluid near the outlet of the water turbine (11). For example, the target deriving unit (110) decreases the pressure command value. As a result of decreasing the pressure (Pw2) of the fluid near the outlet of the water turbine (11) (increasing the head (ΔPw) of the water turbine (11)) in this manner, the pressure (Pa) of the fluid in the first channel (41) increases, and the pressure (Pa) of the fluid in the first channel (41) approaches the first target pressure (Pa*).

Step (ST18)

If the pressure (Pa) of the fluid in the first channel (41) matches the first target pressure (Pa*), the controller (13) maintains the pressure (Pw2) of the fluid near the outlet of the water turbine (11). For example, the target deriving unit (110) maintains the pressure command value without changing it. As a result of maintaining the pressure (Pw2) of the fluid near the outlet of the water turbine (11) (the head (ΔPw) of the water turbine (11)) in this manner, the pressure (Pa) of the fluid in the first channel (41) is maintained.

Second Control (Head Control)

Next, with reference to FIG. 7, a description will be given of a case in which head control (control of the head (ΔPw) of the water turbine (11)) is performed in the second control by the controller (13) of Embodiment 1. Hereinafter, a description will be given of, as an example, the case of controlling the pressure (Pw2) of the fluid near the outlet of the water turbine (11) to control the head (ΔPw) of the water turbine (11).

Step (ST21)

Figure 5:
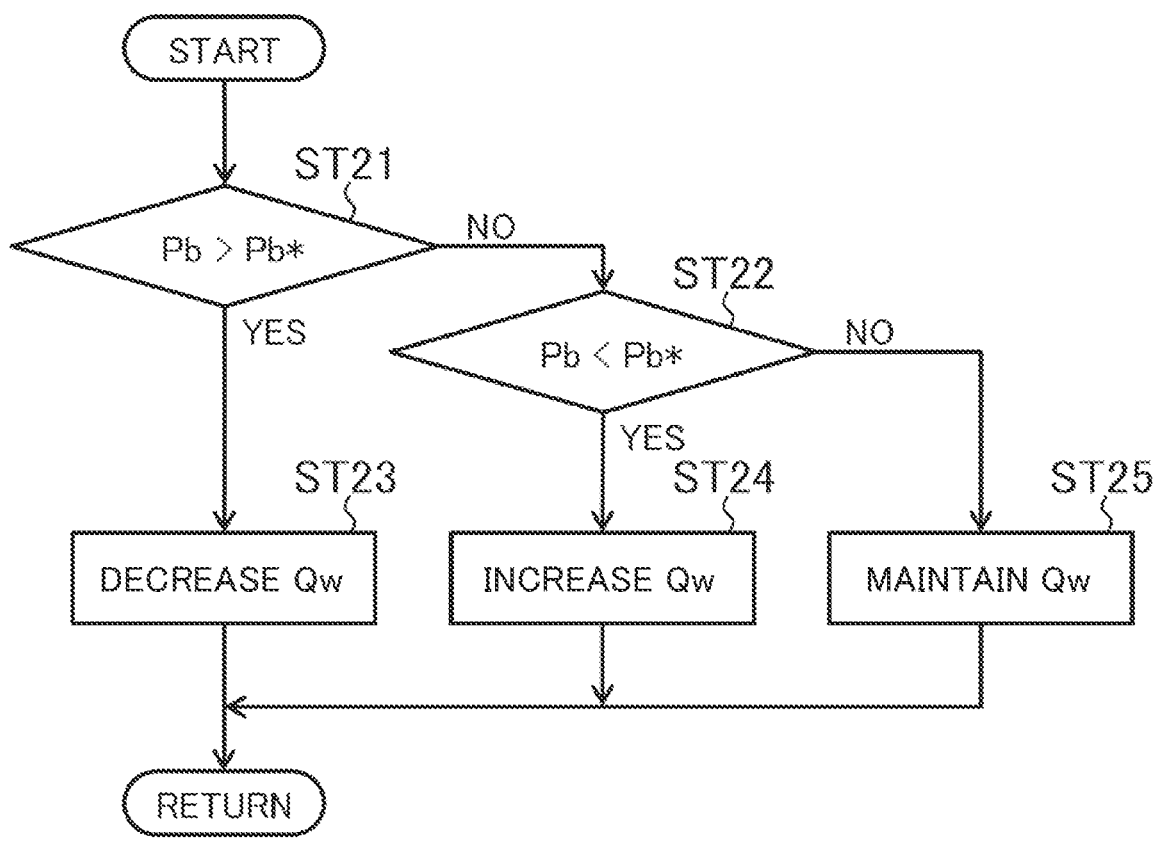
FIG. 5 is a flowchart illustrating second control (flow rate control) in Embodiment 1.

As in the second control illustrated in FIG. 5, the operation of step (ST21) is performed. If the pressure (Pb) of the fluid in the second channel (42) is above the second target pressure (Pb*), the operation of step (ST26) is performed. Otherwise, the operation of step (ST22) is performed.

Step (ST22)

As in the second control illustrated in FIG. 5, the operation of step (ST22) is performed. If the pressure (Pb) of the fluid in the second channel (42) is below the second target pressure (Pb*), the operation of step (ST27) is performed. Otherwise, the operation of step (ST28) is performed.

Step (ST26)

If the pressure (Pb) of the fluid in the second channel (42) is above the second target pressure (Pb*), the controller (13) decreases the pressure (Pw2) of the fluid near the outlet of the water turbine (11). For example, the target deriving unit (110) decreases the pressure command value. As a result of decreasing the pressure (Pw2) of the fluid near the outlet of the water turbine (11) (increasing the head (ΔPw) of the water turbine (11)) in this manner, the pressure (Pb) of the fluid in the second channel (42) decreases, and the pressure (Pb) of the fluid in the second channel (42) approaches the second target pressure (Pb*).

Step (ST27)

If the pressure (Pb) of the fluid in the second channel (42) is below the second target pressure (Pb*), the controller (13) increases the pressure (Pw2) of the fluid near the outlet of the water turbine (11). For example, the target deriving unit (110) increases the pressure command value. As a result of increasing the pressure (Pw2) of the fluid near the outlet of the water turbine (11) (decreasing the head (ΔPw) of the water turbine (11)) in this manner, the pressure (Pb) of the fluid in the second channel (42) increases, and the pressure (Pb) of the fluid in the second channel (42) approaches the second target pressure (Pb*).

Step (ST28)

If the pressure (Pb) of the fluid in the second channel (42) matches the second target pressure (Pb*), the controller (13) maintains the pressure (Pw2) of the fluid near the outlet of the water turbine (11). For example, the target deriving unit (110) maintains the pressure command value without changing it. As a result of maintaining the pressure (Pw2) of the fluid near the outlet of the water turbine (11) (the head (ΔPw) of the water turbine (11)) in this manner, the pressure (Pb) of the fluid in the second channel (42) is maintained.

Number-of-Rotations Control

The controller (13) may be configured to control the number of rotations of the generator (12) instead of controlling the torque of the generator (12), to control the flow rate (Qw) or the head (ΔPw) of the water turbine (11). Specifically, the generator control unit (101) may include a number-of-rotations calculating unit (not illustrated) instead of the torque calculating unit (11*l*). The number-of-rotations calculating unit derives a number-of-rotations command value corresponding to a target value of the number of rotations of the generator (12) so that the flow rate (Qw) of the water turbine (11) approaches the flow rate command value (Qw*). Alternatively, the number-of-rotations calculating unit derives a number-of-rotations command value so that the head (ΔPw) of the water turbine (11) (for example, the pressure (Pw2) of the fluid near the outlet of the water turbine (11)) approaches the head command value (for example, the pressure command value). The voltage calculating unit (112) may derive a voltage command value (V*) on the basis of the number-of-rotations command value derived by the number-of-rotations calculating unit.

Advantages of Embodiment 1

As described above, the hydroelectric power generation system (10) of Embodiment 1 includes the water turbine (11) disposed in the channel (40) through which a fluid flows, the generator (12) driven by the water turbine (11), and the controller (13) that performs first control. The channel (40) includes the first channel (41) located on an inflow side of the water turbine (11). The controller (13) controls, in the first control, the flow rate (Qw) or the head (ΔPw) of the water turbine (11) so that the pressure (Pa) of the fluid in the first channel (41) approaches the first target value.

In Embodiment 1, as a result of performing the first control, the pressure (Pa) of the fluid in the first channel (41)(an example of a state of the first channel (41)), which is a channel on the inflow side of the water turbine (11), can be managed. For example, the pressure (Pa) of the fluid in the first channel (41) can be controlled to be constant, and thus a stress imposed on the pipes constituting the first channel (41) can be reduced. Accordingly, the occurrence of leakage of a fluid (for example, leakage of water) in the first channel (41) can be suppressed.

In the hydroelectric power generation system (10) of Embodiment 1, the controller (13) is capable of performing first control and second control by switching therebetween. The channel (40) includes the first channel (41) and the second channel (42) that is located on an outflow side of the water turbine (11). The controller (13) controls, in the second control, the flow rate (Qw) or the head (ΔPw) of the water turbine (11) so that the pressure (Pb) of the fluid in the second channel (42) approaches the second target value.

In Embodiment 1, as a result of performing the second control, the pressure (Pb) of the fluid in the second channel (42) (an example of a state of the second channel (42)), which is a channel on the outflow side of the water turbine (11), can be managed.

In the hydroelectric power generation system (10) of Embodiment 1, the first channel (41) includes the water turbine channel (45) through which at least part of a fluid that is to flow into the water turbine (11) flows, and the branch channel (46) that branches from the water turbine channel (45).

In Embodiment 1, as a result of performing the first control, the pressure (Pb) of the fluid in the water turbine channel (45) or the branch channel (46) (an example of a state of the water turbine channel (45) or the branch channel (46)) can be managed.

The hydroelectric power generation system (10) of Embodiment 1 is a hydroelectric power generation system characterized in that the controller (13) is capable of operating by using power obtained by the generator (12).

In Embodiment 1, as a result of operating the controller (13) by using the power obtained by the generator (12), first control can be performed even when a failure occurs in the power system that supplies power to the controller (13).

Modification 1 of Embodiment 1

Figure 8:
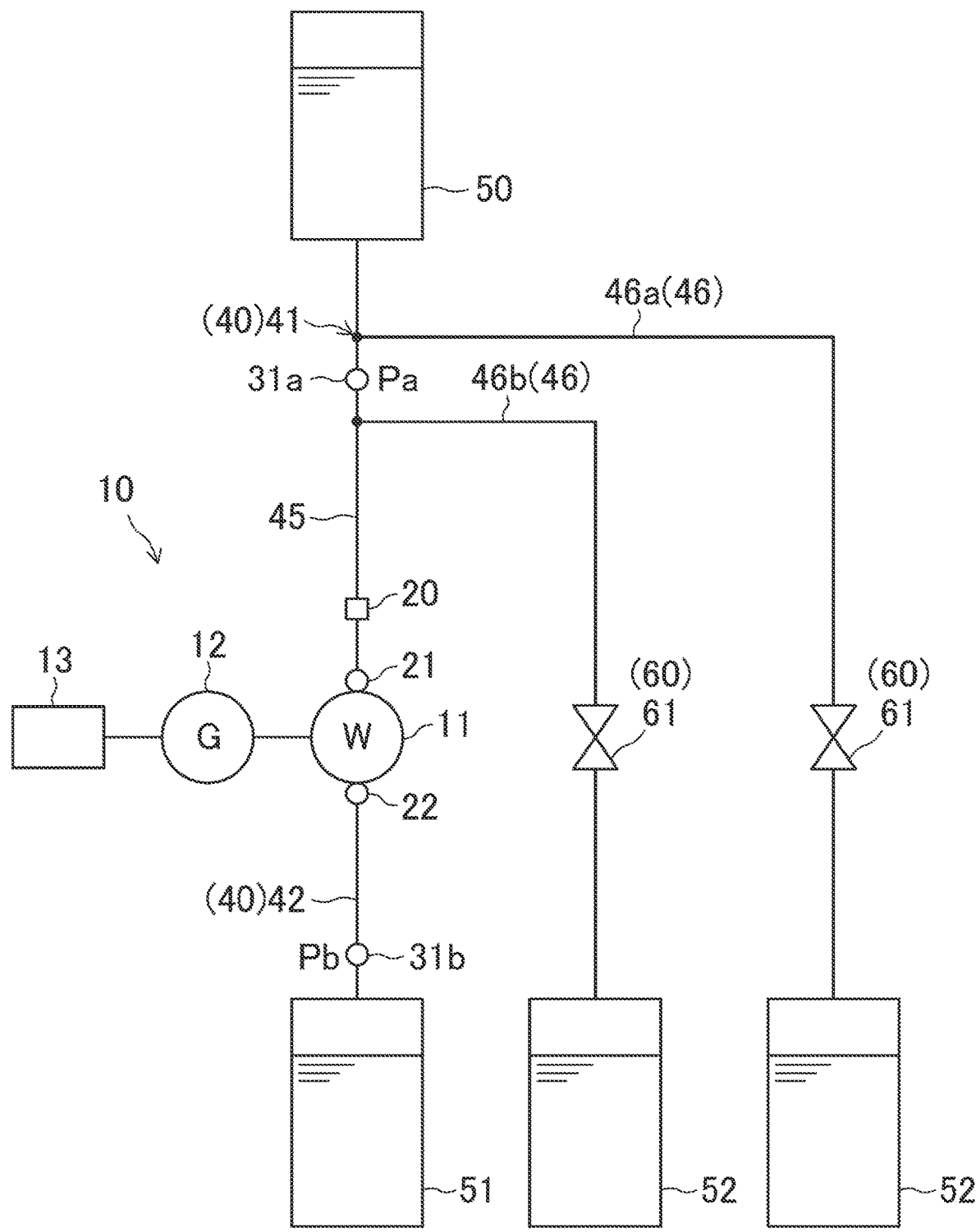
FIG. 8 is a diagram illustrating the configuration of a channel provided with a hydroelectric power generation system according to Modification 1 of Embodiment 1.

As illustrated in FIG. 8, the branch channel (46) may be formed of a plurality of channels. In the example in FIG. 8, the branch channel (46) is formed of a first branch channel (46*a*) and a second branch channel (46*b*). The first branch channel (46*a*) and the second branch channel (46*b*) each branch from the water turbine channel (45). In the example in FIG. 8, the first branch channel (46*a*) and the second branch channel (46*b*) are each provided with the manual valve (61), which is an example of the adjustment mechanism (60). The first branch channel (46*a*) and the second branch channel (46*b*) each have an outlet connected to the branch reservoir (52).

Modification 2 of Embodiment 1

Figure 9:
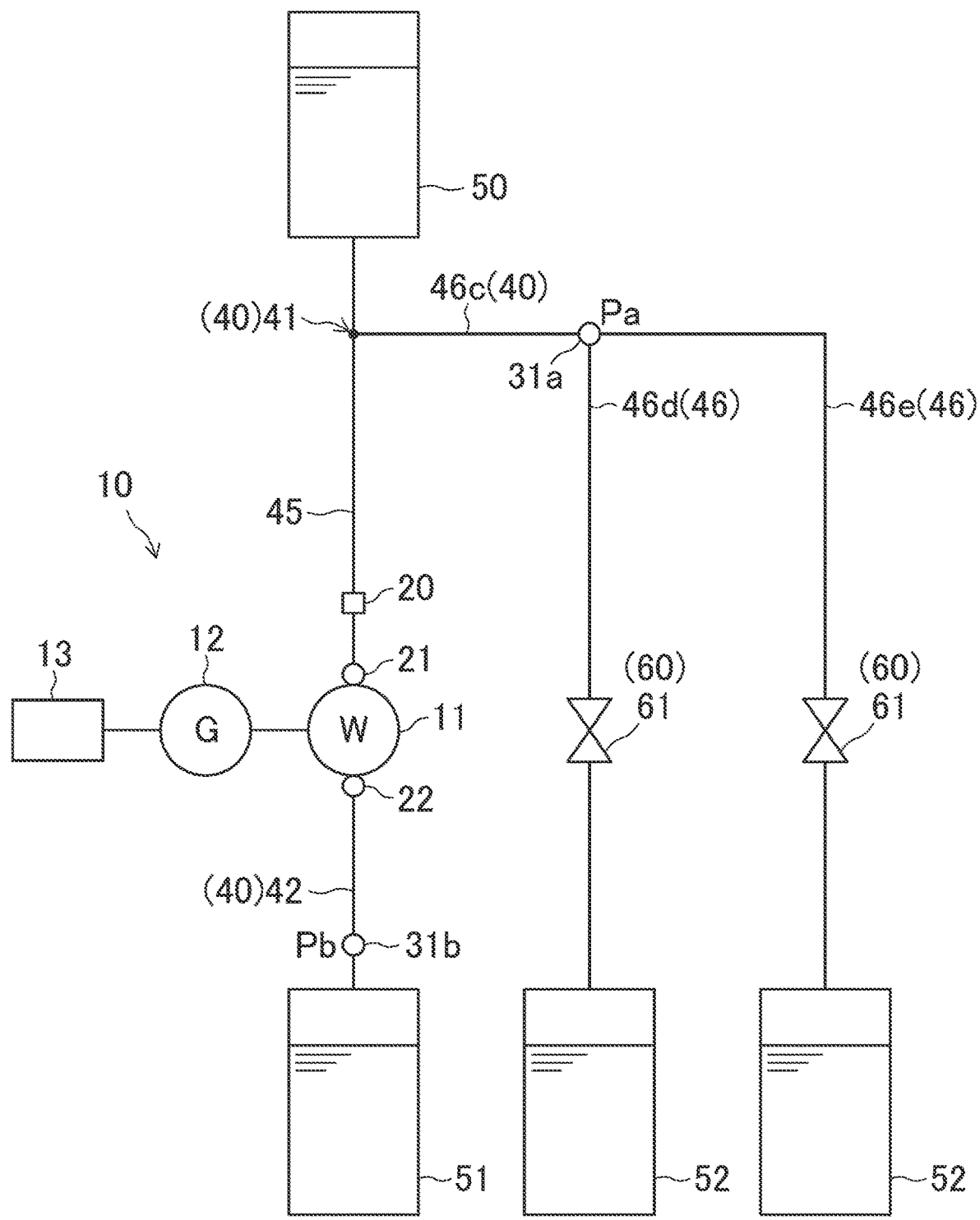
FIG. 9 is a diagram illustrating the configuration of a channel provided with a hydroelectric power generation system according to Modification 2 of Embodiment 1.

As illustrated in FIG. 9, the branch channel (46) may branch into a plurality of channels. In the example in FIG. 9, the branch channel (46) is formed of a main channel (46*c*), a first sub-channel (46*d*), and a second sub-channel (46*e*). The main channel (46*c*) branches from the water turbine channel (45). The first sub-channel (46*d*) and the second sub-channel (46*e*) are each connected to an outlet of the main channel (46*c*). In the example in FIG. 9, the first sub-channel (46*d*) and the second sub-channel (46*e*) are each provided with the manual valve (61), which is an example of the adjustment mechanism (60). The first sub-channel (46*d*) and the second sub-channel (46*c*) each have an outlet connected to the branch reservoir (52).

Modification 3 of Embodiment 1

Figure 10:
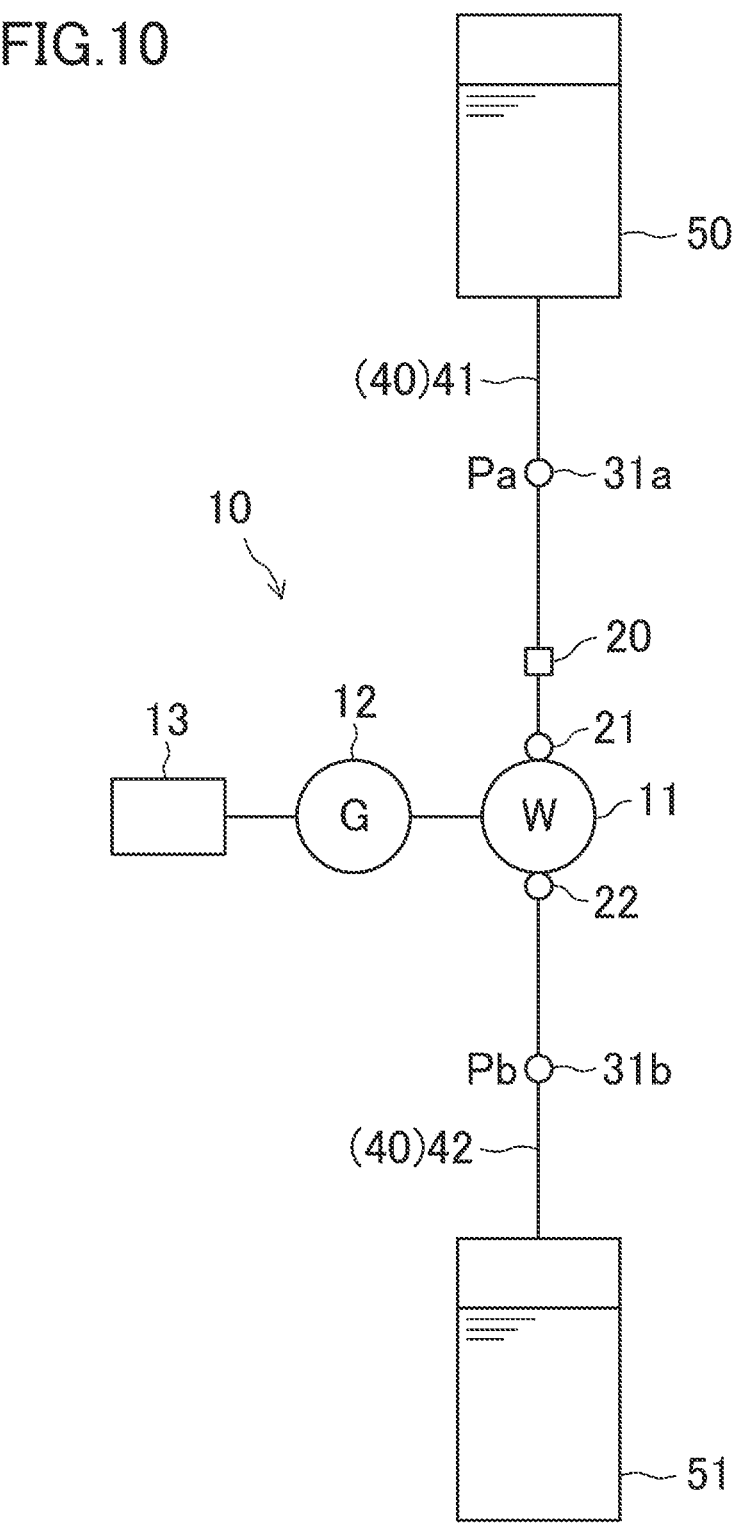
FIG. 10 is a diagram illustrating the configuration of a channel provided with a hydroelectric power generation system according to Modification 3 of Embodiment 1.

As illustrated in FIG. 10, the first channel (41) does not need to include the branch channel (46), and may include only the water turbine channel (45). In other words, the first channel (41) may be formed of a single channel. In this example, the first channel (41) connects the first reservoir (50) and the water turbine (11).

Modification 4 of Embodiment 1

The controller (13) may control, in the first control, the flow rate (Qw) or the head (ΔPw) of the water turbine (11) so that the pressure of the fluid near the inlet of the adjustment mechanism (60) approaches the first target value. In other words, the pressure (Pa) of the fluid in the first channel (41) that is a target to be controlled in the first control may be the pressure of the fluid near the inlet of the adjustment mechanism (60).

As described above, in the first control, the flow rate (Qw) or the head (ΔPw) of the water turbine (11) is controlled so that the pressure of the fluid near the inlet of the adjustment mechanism (60) approaches the first target value, and thus the controllability of the adjustment mechanism (60) can be increased. For example, the flow rate (Qw) or the head (ΔPw) of the water turbine (11) is controlled so that the pressure of the fluid near the inlet of the adjustment mechanism (60) is within a range corresponding to the normal performance of the adjustment mechanism (60) (a range in which the normal performance of the adjustment mechanism (60) can be fulfilled), and thus the normal performance of the adjustment mechanism (60) can be fulfilled.

Embodiment 2

Figure 11:
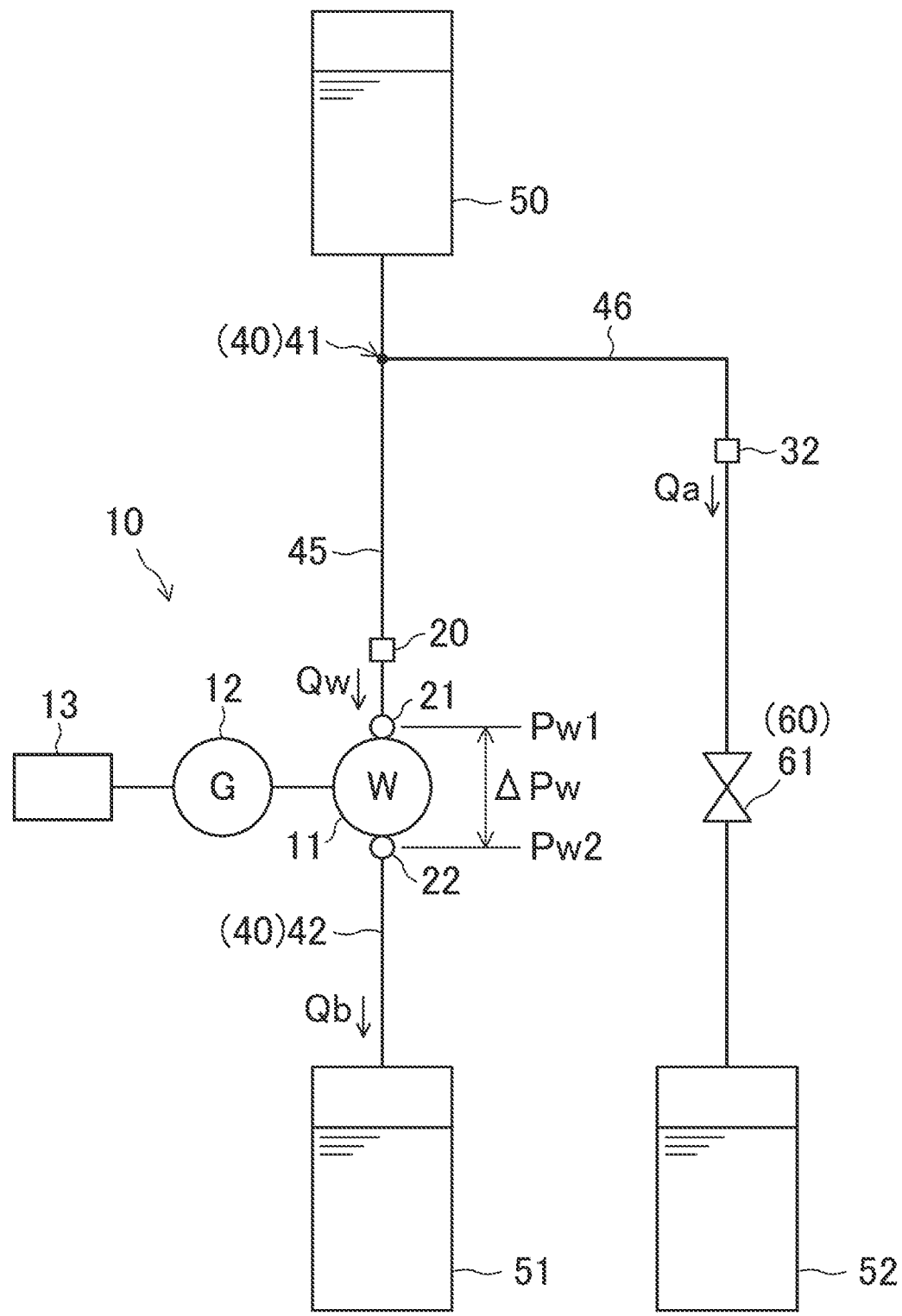
FIG. 11 is a diagram illustrating the configuration of a channel provided with a hydroelectric power generation system according to Embodiment 2.

FIG. 11 illustrates the configuration of a channel (40) provided with a hydroelectric power generation system (10) according to Embodiment 2. The hydroelectric power generation system (10) according to Embodiment 2 is different from the hydroelectric power generation system (10) according to Embodiment 1 in first control and second control performed by the controller (13). The hydroelectric power generation system (10) according to Embodiment 2 is provided with a first flow rate sensor (32) instead of the first pressure sensor (31*a*) and the second pressure sensor (31*b*). Other than this point, the configuration of the hydroelectric power generation system (10) according to Embodiment 2 is similar to the configuration of the hydroelectric power generation system (10) according to Embodiment 1.

First Flow Rate Sensor

The first flow rate sensor (32) detects a flow rate (Qa) of a fluid in the first channel (41). In this example, the first flow rate sensor (32) is provided in the branch channel (46). The first flow rate sensor (32) then transmits a detection signal indicating a detection result (the flow rate (Qa) of the fluid in the first channel (41)) to the controller (13).

Controller

In Embodiment 2, the controller (13) controls, in the first control, the flow rate (Qw) or the head (ΔPw) of the water turbine (11) so that the flow rate (Qa) of the fluid in the first channel (41) approaches a first target value. Specifically, in the first control, the target deriving unit (110) receives the flow rate (Qa) of the fluid in the first channel (41) and a first target flow rate (Qa*) (an example of the first target value) corresponding to a target value of the flow rate (Qa) of the fluid in the first channel (41). The target deriving unit (110) derives a flow rate command value (Qw*) so that the flow rate (Qa) of the fluid in the first channel (41) approaches the first target flow rate (Qa*).

In Embodiment 2, the controller (13) controls, in the second control, the flow rate (Qw) or the head (ΔPw) of the water turbine (11) so that a flow rate (Qb) of a fluid in the second channel (42) approaches a second target value. Specifically, in the second control, the target deriving unit (110) receives the flow rate (Qb) of the fluid in the second channel (42) and a second target flow rate (Qb*) (an example of the second target value) corresponding to a target value of the flow rate (Qb) of the fluid in the second channel (42). The target deriving unit (110) derives a flow rate command value (Qw*) so that the flow rate (Qb) of the fluid in the second channel (42) approaches the second target flow rate (Qb*). In the example in FIG. 11, the flow rate (Qb) of the fluid in the second channel (42) is the same as the flow rate (Qw) of the water turbine (11).

First Control (Flow Rate Control)

Next, first control by the controller (13) in Embodiment 2 will be described with reference to FIG. 12. Hereinafter, a description will be given of, as an example, a case in which flow rate control (control of the flow rate (Qw) of the water turbine (11)) is performed in the first control.

Step (ST31)

The controller (13) determines whether the flow rate (Qa) of the fluid in the first channel (41) is above the first target flow rate (Qa*). For example, the determination is performed by the target deriving unit (110). If the flow rate (Qa) of the fluid in the first channel (41) is above the first target flow rate (Qa*), the operation of step (ST13) is performed. Otherwise, the operation of step (ST32) is performed.

Step (ST32)

The controller (13) determines whether the flow rate (Qa) of the fluid in the first channel (41) is below the first target flow rate (Qa*). For example, the determination is performed by the target deriving unit (110). If the flow rate (Qa) of the fluid in the first channel (41) is below the first target flow rate (Qa*), the operation of step (ST14) is performed. Otherwise, the operation of step (ST15) is performed.

Step (ST13)

If the flow rate (Qa) of the fluid in the first channel (41) is above the first target flow rate (Qa*), the controller (13) increases the flow rate (Qw) of the water turbine (11). Accordingly, the flow rate (Qa) of the fluid in the first channel (41) decreases, and the flow rate (Qa) of the fluid in the first channel (41) approaches the first target flow rate (Qa*).

Step (ST14)

If the flow rate (Qa) of the fluid in the first channel (41) is below the first target flow rate (Qa*), the controller (13) decreases the flow rate (Qw) of the water turbine (11). Accordingly, the flow rate (Qa) of the fluid in the first channel (41) increases, and the flow rate (Qa) of the fluid in the first channel (41) approaches the first target flow rate (Qa*).

Step (ST15)

If the flow rate (Qa) of the fluid in the first channel (41) matches the first target flow rate (Qa*), the controller (13) maintains the flow rate (Qw) of the water turbine (11). Accordingly, the flow rate (Qa) of the fluid in the first channel (41) is maintained. Second control (flow rate control)

Next, second control by the controller (13) in Embodiment 2 will be described with reference to FIG. 13. Hereinafter, a description will be given of, as an example, a case in which flow rate control (control of the flow rate (Qw) of the water turbine (11)) is performed in the second control.

Step (ST41)

The controller (13) determines whether the flow rate (Qb) of the fluid in the second channel (42) is above the second target flow rate (Qb*). For example, the determination is performed by the target deriving unit (110). If the flow rate (Qb) of the fluid in the second channel (42) is above the second target flow rate (Qb*), the operation of step (ST23) is performed. Otherwise, the operation of step (ST42) is performed.

Step (ST42)

The controller (13) determines whether the flow rate (Qb) of the fluid in the second channel (42) is below the second target flow rate (Qb*). For example, the determination is performed by the target deriving unit (110). If the flow rate (Qb) of the fluid in the second channel (42) is below the second target flow rate (Qb*), the operation of step (ST24) is performed. Otherwise, the operation of step (ST25) is performed.

Step (ST23)

If the flow rate (Qb) of the fluid in the second channel (42) is above the second target flow rate (Qb*), the controller (13) decreases the flow rate (Qw) of the water turbine (11). Accordingly, the flow rate (Qb) of the fluid in the second channel (42) decreases, and the flow rate (Qb) of the fluid in the second channel (42) approaches the second target flow rate (Qb*).

Step (ST24)

If the flow rate (Qb) of the fluid in the second channel (42) is below the second target flow rate (Qb*), the controller (13) increases the flow rate (Qw) of the water turbine (11). Accordingly, the flow rate (Qb) of the fluid in the second channel (42) increases, and the flow rate (Qb) of the fluid in the second channel (42) approaches the second target flow rate (Qb*).

Step (ST25)

If the flow rate (Qb) of the fluid in the second channel (42) matches the second target flow rate (Qb*), the controller (13) maintains the flow rate (Qw) of the water turbine (11). Accordingly, the flow rate (Qb) of the fluid in the second channel (42) is maintained.

Head Control

In Embodiment 2, as in Embodiment 1, the controller (13) may be configured to control the torque of the generator (12) to control the head (ΔPw) of the water turbine (11).

First Control (Head Control)

Figure 6:
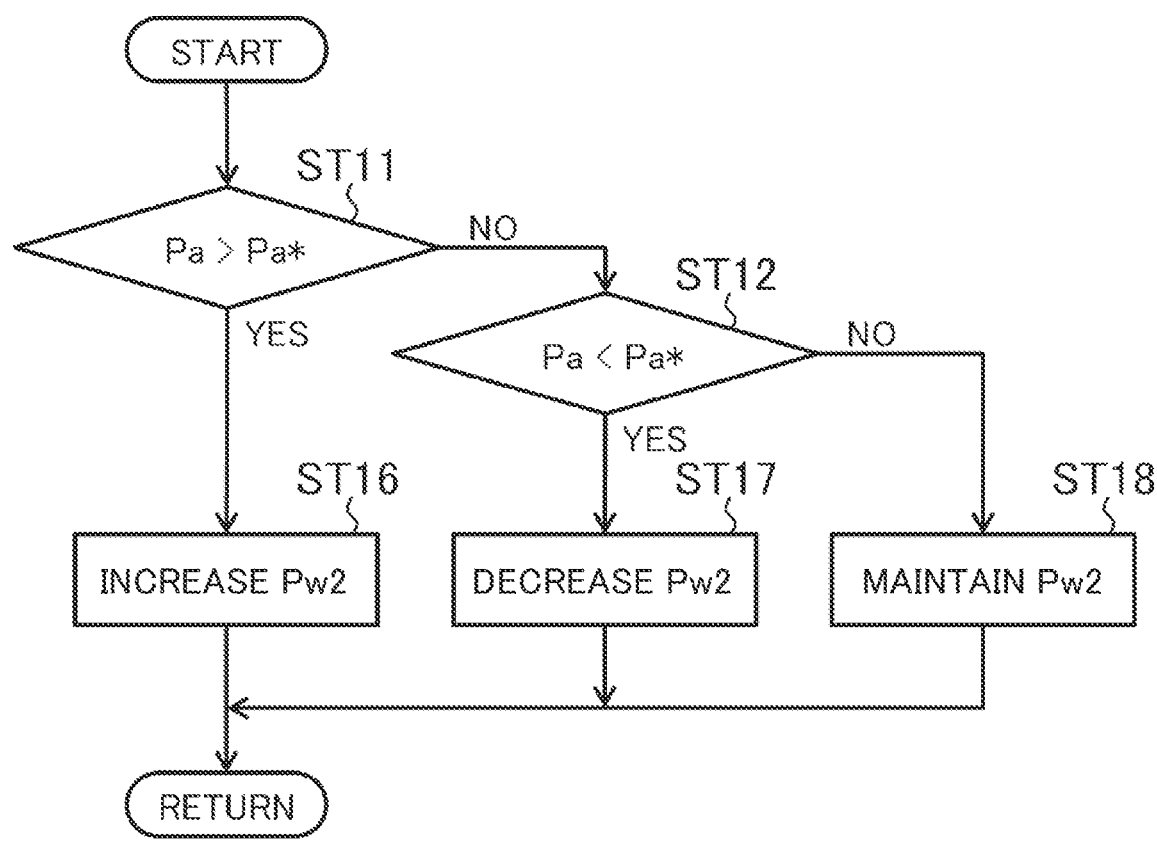
FIG. 6 is a flowchart illustrating first control (head control) in Embodiment 1.
Figure 12:
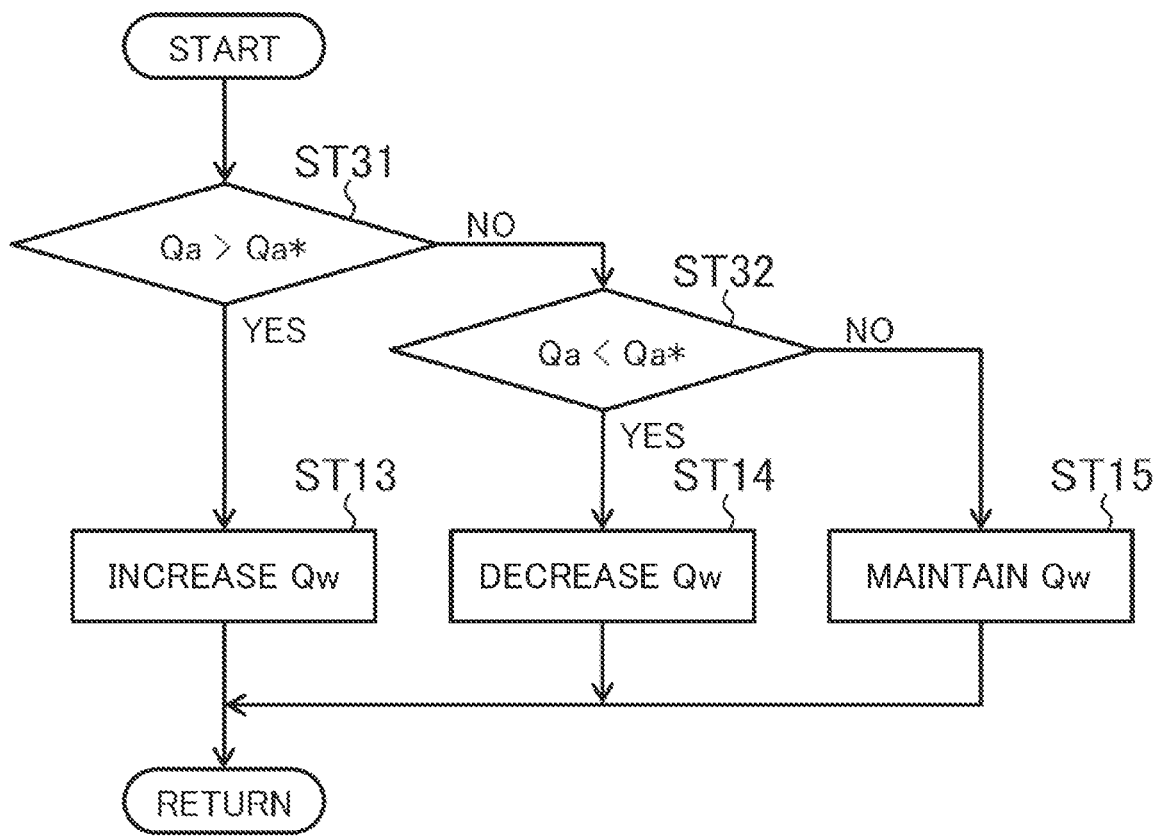
FIG. 12 is a flowchart illustrating first control (flow rate control) in Embodiment 2.

In a case where head control (control of the head (ΔPw) of the water turbine (11)) is performed in first control by the controller (13) in Embodiment 2, steps (ST16, ST17, ST18) illustrated in FIG. 6 are performed instead of steps (ST13, ST14, ST15) illustrated in FIG. 12.

Second Control (Head Control)

Figure 7:
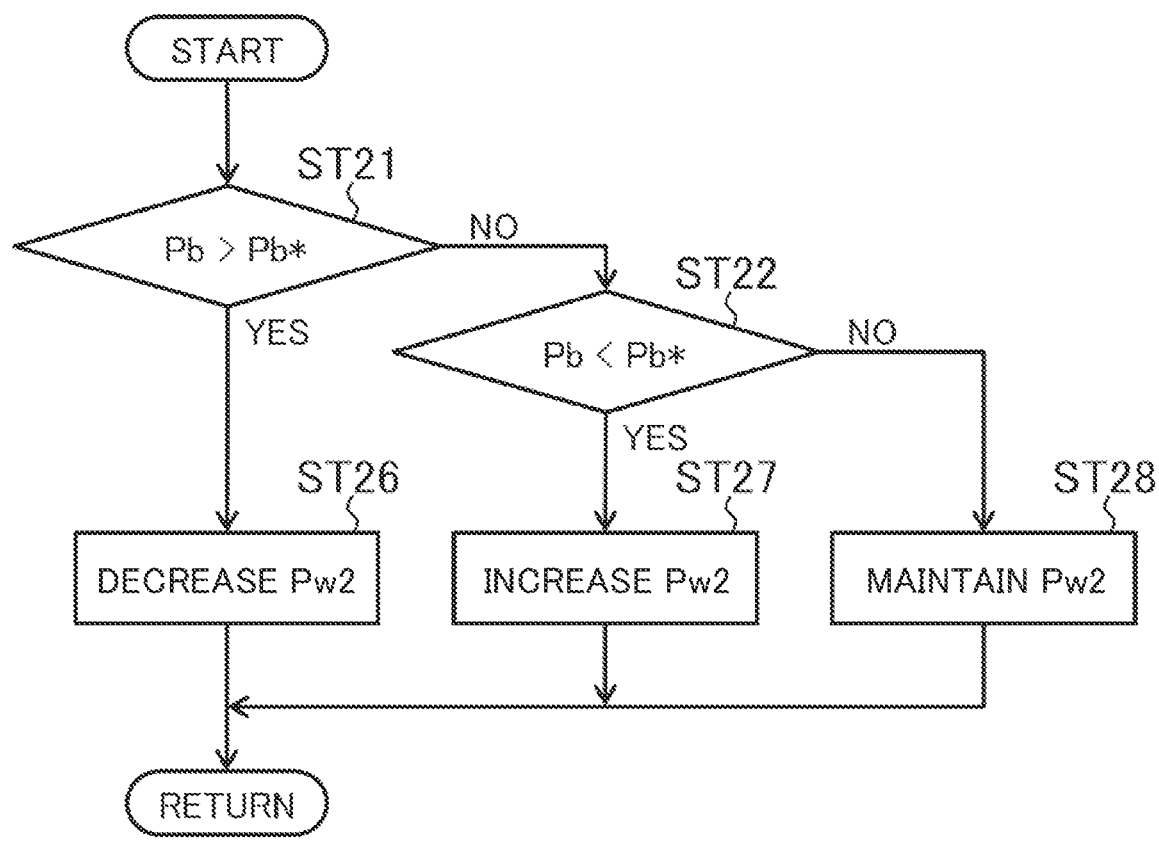
FIG. 7 is a flowchart illustrating second control (head control) in Embodiment 1.
Figure 13:
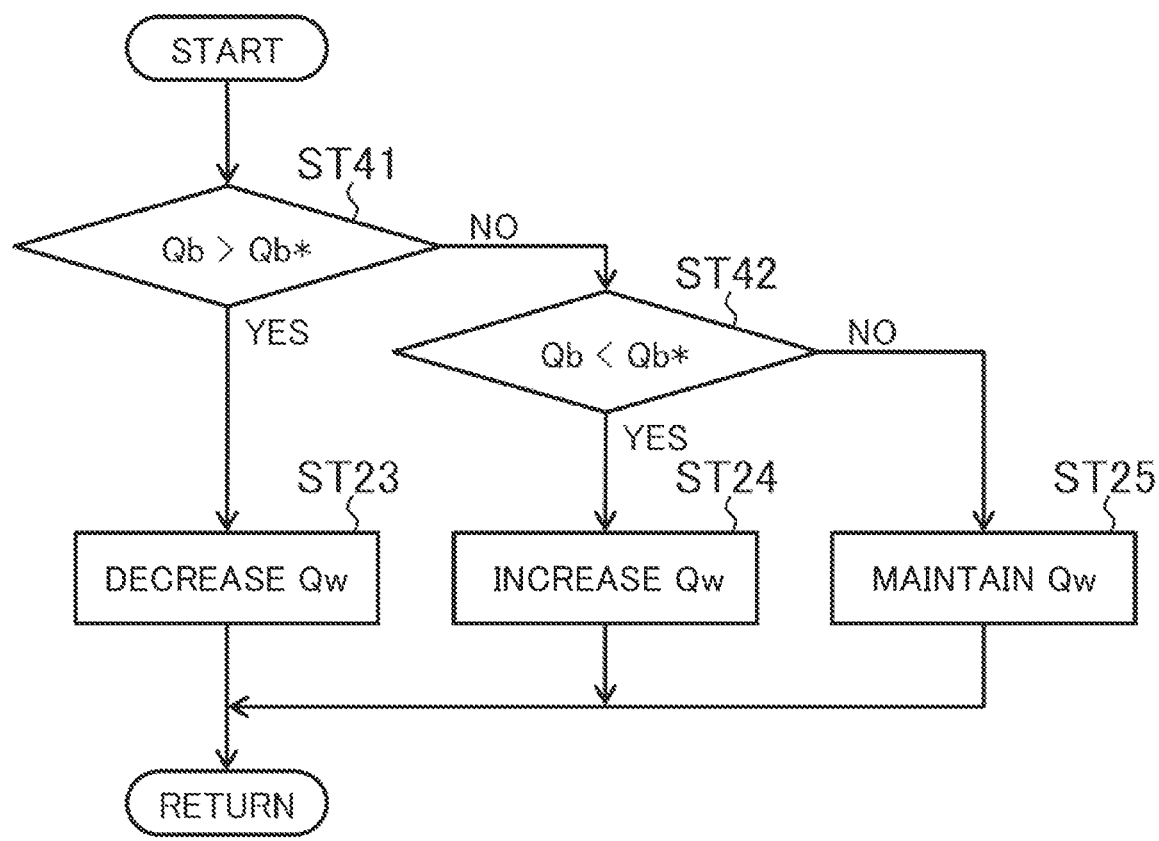
FIG. 13 is a flowchart illustrating second control (flow rate control) in Embodiment 2.

In a case where head control (control of the head (ΔPw) of the water turbine (11)) is performed in second control by the controller (13) in Embodiment 2, steps (ST26, ST27, ST28) illustrated in FIG. 7 are performed instead of steps (ST23, ST24, ST25) illustrated in FIG. 13.

Number-of-Rotations Control

In Embodiment 2, as in Embodiment 1, the controller (13) may be configured to control the number of rotations of the generator (12) instead of controlling the torque of the generator (12), to control the flow rate (Qw) or the head (ΔPw) of the water turbine (11).

Advantages of Embodiment 2

As described above, the hydroelectric power generation system (10) of Embodiment 2 includes the water turbine (11)

disposed in the channel (40) through which a fluid flows, the generator (12) driven by the water turbine (11), and the controller (13) that performs first control. The channel (40) includes the first channel (41) located on an inflow side of the water turbine (11). The controller (13) controls, in the first control, the flow rate (Qw) or the head (ΔPw) of the water turbine (11) so that the flow rate (Qa) of the fluid in the first channel (41) approaches the first target value.

In Embodiment 2, as a result of performing the first control, the flow rate (Qa) of the fluid in the first channel (41) (an example of a state of the first channel (41)), which is a channel on the inflow side of the water turbine (11), can be managed. This eliminates the necessity for providing the first channel (41) with a mechanism for adjusting the flow rate (Qa) of the fluid in the first channel (41), and thus an installation cost can be reduced.

In the hydroelectric power generation system (10) of Embodiment 2, the controller (13) is capable of performing first control and second control by switching therebetween. The channel (40) includes the first channel (41) and the second channel (42) that is located on an outflow side of the water turbine (11). The controller (13) controls, in the second control, the flow rate (Qw) or the head (ΔPw) of the water turbine (11) so that the flow rate (Qb) of the fluid in the second channel (42) approaches the second target value.

In Embodiment 2, as a result of performing the second control, the flow rate (Qb) of the fluid in the second channel (42) (an example of a state of the second channel (42)), which is a channel on the outflow side of the water turbine (11), can be managed.

In the hydroelectric power generation system (10) of Embodiment 2, the first channel (41) includes the water turbine channel (45) through which at least part of a fluid that is to flow into the water turbine (11) flows, and the branch channel (46) that branches from the water turbine channel (45).

In Embodiment 2, as a result of performing the first control, the flow rate (Qb) of the fluid in the water turbine channel (45) or the branch channel (46) (an example of a state of the water turbine channel (45) or the branch channel (46)) can be managed.

The hydroelectric power generation system (10) of Embodiment 2 is a hydroelectric power generation system characterized in that the controller (13) is capable of operating by using power obtained by the generator (12).

In Embodiment 2, as a result of operating the controller (13) by using the power obtained by the generator (12), first control can be performed even when a failure occurs in the power system that supplies power to the controller (13).

In Embodiment 2, the channel (40) may have the configuration illustrated in FIG. 8, FIG. 9, or FIG. 10. Specifically, the branch channel (46) may be formed of a plurality of channels, or the branch channel (46) may branch into a plurality of channels. Alternatively, the first channel (41) may be formed of a single channel.

Embodiment 3

Figure 14:
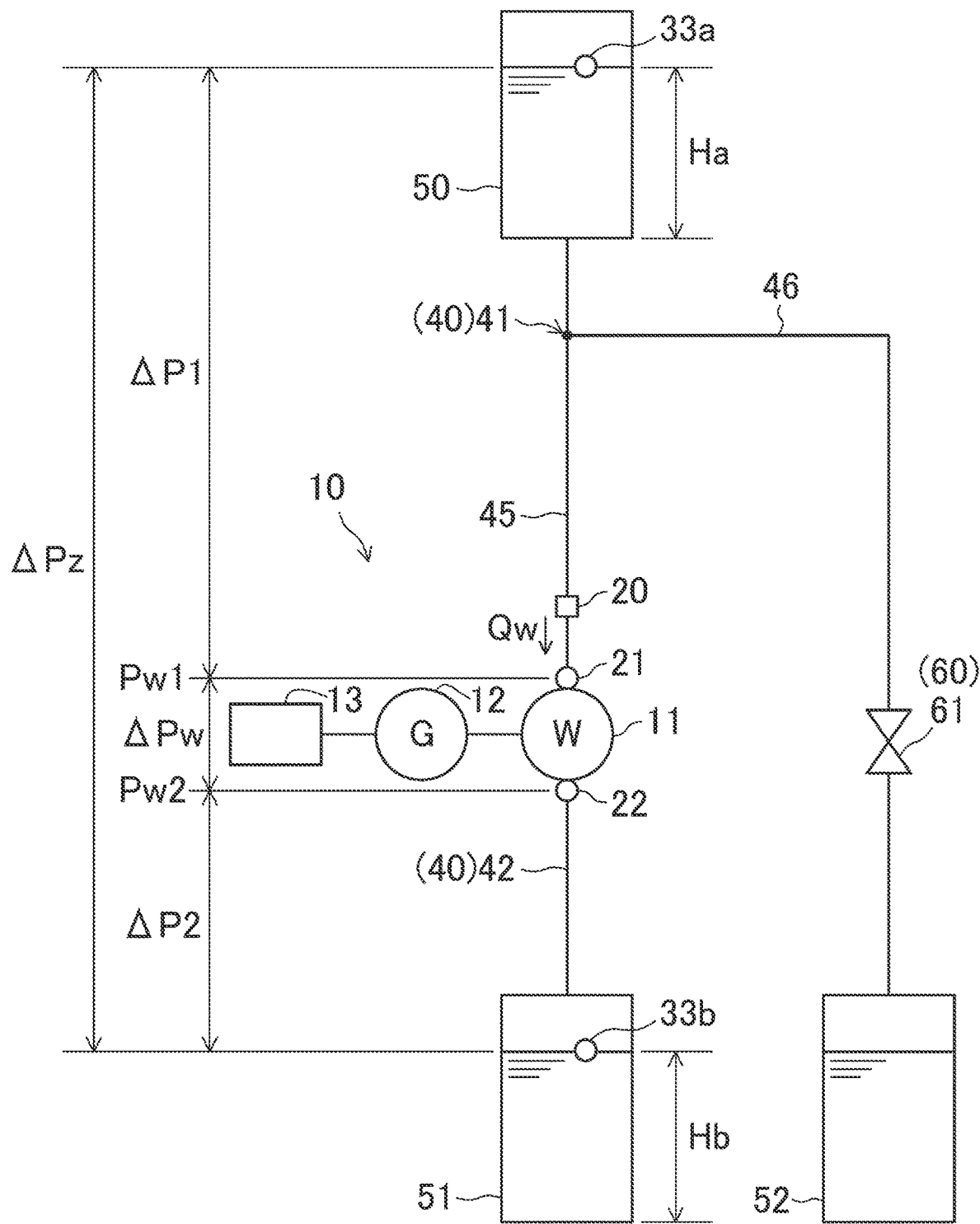
FIG. 14 is a diagram illustrating the configuration of a channel provided with a hydroelectric power generation system according to Embodiment 3.

FIG. 14 illustrates the configuration of a channel (40) provided with a hydroelectric power generation system (10) according to Embodiment 3. The hydroelectric power generation system (10) according to Embodiment 3 is different from the hydroelectric power generation system (10) according to Embodiment 1 in first control and second control performed by the controller (13). The hydroelectric power generation system (10) according to Embodiment 3 is provided with a first liquid level sensor (33a) and a second liquid level sensor (33b) instead of the first pressure sensor (31a) and the second pressure sensor (31b). Other than this point, the configuration of the hydroelectric power generation system (10) according to Embodiment 3 is similar to the configuration of the hydroelectric power generation system (10) according to Embodiment 1.

First Liquid Level Sensor

The first liquid level sensor (33a) detects a liquid level (Ha) of a liquid in the first reservoir (50). The first liquid level sensor (33a) then transmits a detection signal indicating a detection result (the liquid level (Ha) of the liquid in the first reservoir (50)) to the controller (13).

Second Liquid Level Sensor

The second liquid level sensor (33b) detects a liquid level (Hb) of a liquid in the second reservoir (51). The second liquid level sensor (33b) then transmits a detection signal indicating a detection result (the liquid level (Hb) of the liquid in the second reservoir (51)) to the controller (13).

Controller

In Embodiment 3, the controller (13) controls, in the first control, the flow rate (Qw) or the head (ΔPw) of the water turbine (11) so that the liquid level (Ha) of the fluid in the first reservoir (50) from which the fluid flows out to the first channel (41) approaches a first target value. Specifically, in the first control, the target deriving unit (110) receives the liquid level (Ha) of the fluid in the first reservoir (50) and a first target liquid level (an example of the first target value) corresponding to a target value of the liquid level (Ha) of the fluid in the first reservoir (50). The target deriving unit (110) derives a flow rate command value (Qw*) so that the liquid level (Ha) of the fluid in the first reservoir (50) approaches the first target liquid level.

In Embodiment 3, the controller (13) controls, in the second control, the flow rate (Qw) or the head (ΔPw) of the water turbine (11) so that the liquid level (Hb) of the fluid in the second reservoir (51) into which the fluid flows from the second channel (42) approaches a second target value. Specifically, in the second control, the target deriving unit (110) receives the liquid level (Hb) of the fluid in the second reservoir (51) and a second target liquid level (Hb*)(an example of the second target value) corresponding to a target value of the liquid level (Hb) of the fluid in the second reservoir (51). The target deriving unit (110) derives a flow rate command value (Qw*) so that the liquid level (Hb) of the fluid in the second reservoir (51) approaches the second target liquid level (Hb*).

First Control (Flow Rate Control)

Next, first control by the controller (13) in Embodiment 3 will be described with reference to FIG. 15. Hereinafter, a description will be given of, as an example, a case in which flow rate control (control of the flow rate (Qw) of the water turbine (11)) is performed in the first control. Hereinafter, a description will be given of, as an example, the case of controlling a total head (ΔPz) to control the liquid level (Ha) of the fluid in the first reservoir (50). Specifically, the target deriving unit (110) receives the total head (ΔPz) and a target total head (ΔPz*) (an example of the first target value) corresponding to a target value of the total head (ΔPz). The target deriving unit (110) derives a flow rate command value (Qw*) so that the total head (ΔPz) approaches the target total head (ΔPz*). The total head (ΔPz) corresponds to the sum of a head (ΔP1) between the first reservoir (50) and the water turbine (11), the head (ΔPw) of the water turbine (11), and a head (ΔP2) between the water turbine (11) and the second reservoir (51). Here, it is assumed that the liquid level (Hb) of the fluid in the second reservoir (51) is kept at a certain value.

Step (ST51)

The controller (13) determines whether the total head (ΔPz) is above the target total head (ΔPz*). For example, the determination is performed by the target deriving unit (110). If the total head (ΔPz) is above the target total head (ΔPz*), the operation of step (ST13) is performed. Otherwise, the operation of step (ST52) is performed.

Step (ST52)

The controller (13) determines whether the total head (ΔPz) is blow the target total head (ΔPz*). For example, the determination is performed by the target deriving unit (110). If the total head (ΔPz) is below the target total head (ΔPz*), the operation of step (ST14) is performed. Otherwise, the operation of step (ST15) is performed.

Step (ST13)

If the total head (ΔPz) is above the target total head (ΔPz*), the controller (13) increases the flow rate (Qw) of the water turbine (11). Accordingly, the total head (ΔPz) decreases, and the total head (ΔPz) approaches the target total head (ΔPz*). In other words, the liquid level (Ha) of the fluid in the first reservoir (50) decreases, and the liquid level (Ha) of the fluid in the first reservoir (50) approaches the first target liquid level.

Step (ST14)

If the total head (ΔPz) is below the target total head (ΔPz*), the controller (13) decreases the flow rate (Qw) of the water turbine (11). Accordingly, the total head (ΔPz) increases, and the total head (ΔPz) approaches the target total head (ΔPz*). In other words, the liquid level (Ha) of the fluid in the first reservoir (50) increases, and the liquid level (Ha) of the fluid in the first reservoir (50) approaches the first target liquid level.

Step (ST15)

If the total head (ΔPz) matches the target total head (ΔPz*), the controller (13) maintains the flow rate (Qw) of the water turbine (11). Accordingly, the total head (ΔPz) is maintained. In other words, the liquid level (Ha) of the fluid in the first reservoir (50) is maintained.

Second Control (Flow Rate Control)

Next, second control by the controller (13) in Embodiment 3 will be described with reference to FIG. 16. Hereinafter, a description will be given of, as an example, a case in which flow rate control (control of the flow rate (Qw) of the water turbine (11)) is performed in the second control.

Step (ST61)

The controller (13) determines whether the liquid level (Hb) of the fluid in the second reservoir (51) is above the second target liquid level (Hb*). For example, the determination is performed by the target deriving unit (110). If the liquid level (Hb) of the fluid in the second reservoir (51) is above the second target liquid level (Hb*), the operation of step (ST23) is performed. Otherwise, the operation of step (ST62) is performed.

Step (ST62)

The controller (13) determines whether the liquid level (Hb) of the fluid in the second reservoir (51) is below the second target liquid level (Hb*). For example, the determination is performed by the target deriving unit (110). If the liquid level (Hb) of the fluid in the second reservoir (51) is below the second target liquid level (Hb*), the operation of step (ST24) is performed. Otherwise, the operation of step (ST25) is performed.

Step (ST23)

If the liquid level (Hb) of the fluid in the second reservoir (51) is above the second target liquid level (Hb*), the controller (13) decreases the flow rate (Qw) of the water turbine (11). Accordingly, the liquid level (Hb) of the fluid in the second reservoir (51) decreases, and the liquid level (Hb) of the fluid in the second reservoir (51) approaches the second target liquid level (Hb*).

Step (ST24)

If the liquid level (Hb) of the fluid in the second reservoir (51) is below the second target liquid level (Hb*), the controller (13) increases the flow rate (Qw) of the water turbine (11). Accordingly, the liquid level (Hb) of the fluid in the second reservoir (51) increases, and the liquid level (Hb) of the fluid in the second reservoir (51) approaches the second target liquid level (Hb*).

Step (ST25)

If the liquid level (Hb) of the fluid in the second reservoir (51) matches the second target liquid level (Hb*), the controller (13) maintains the flow rate (Qw) of the water turbine (11). Accordingly, the liquid level (Hb) of the fluid in the second reservoir (51) is maintained.

Head Control

In Embodiment 3, as in Embodiment 1, the controller (13) may be configured to control the torque of the generator (12) to control the head (ΔPw) of the water turbine (11).

First Control (Head Control)

Figure 15:
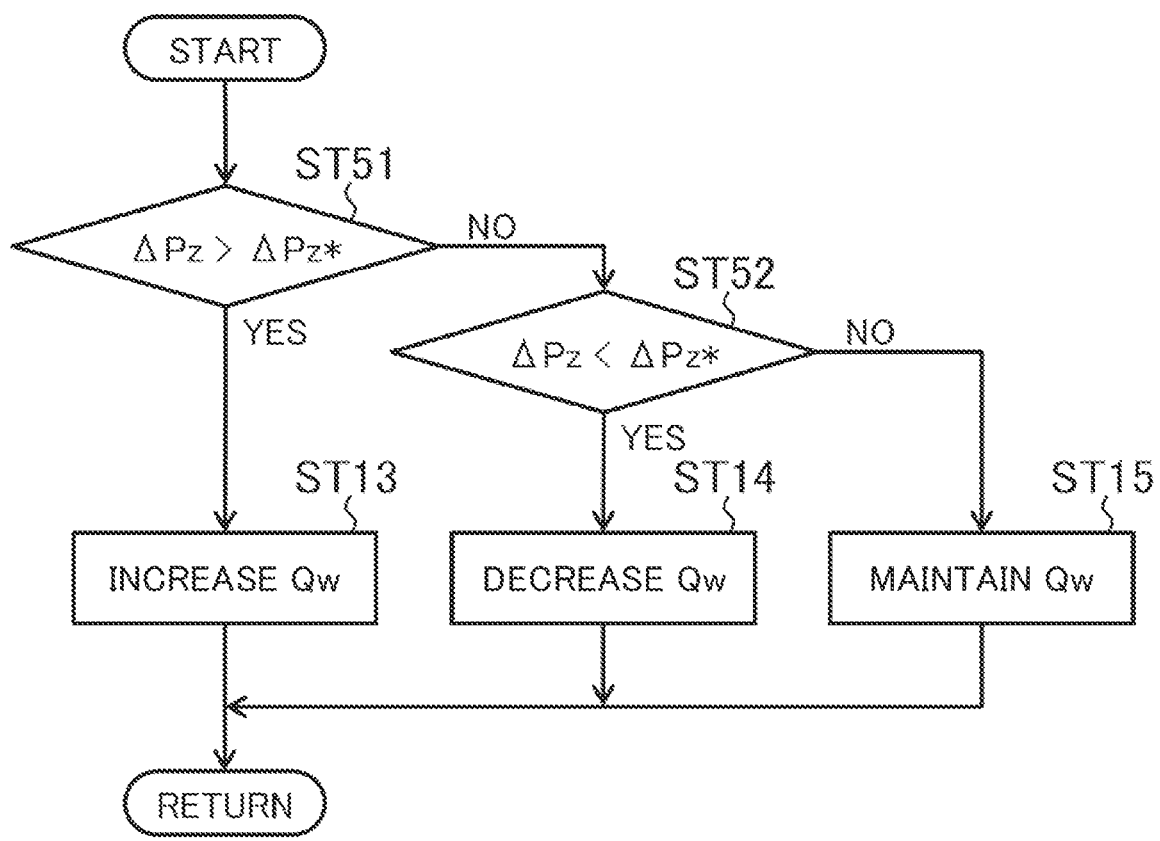
FIG. 15 is a flowchart illustrating first control (flow rate control) in Embodiment 3.

In a case where head control (control of the head (ΔPw) of the water turbine (11)) is performed in first control by the controller (13) in Embodiment 3, steps (ST16, ST17, ST18) illustrated in FIG. 6 are performed instead of steps (ST13, ST14, ST15) illustrated in FIG. 15.

Second Control (Head Control)

Figure 16:
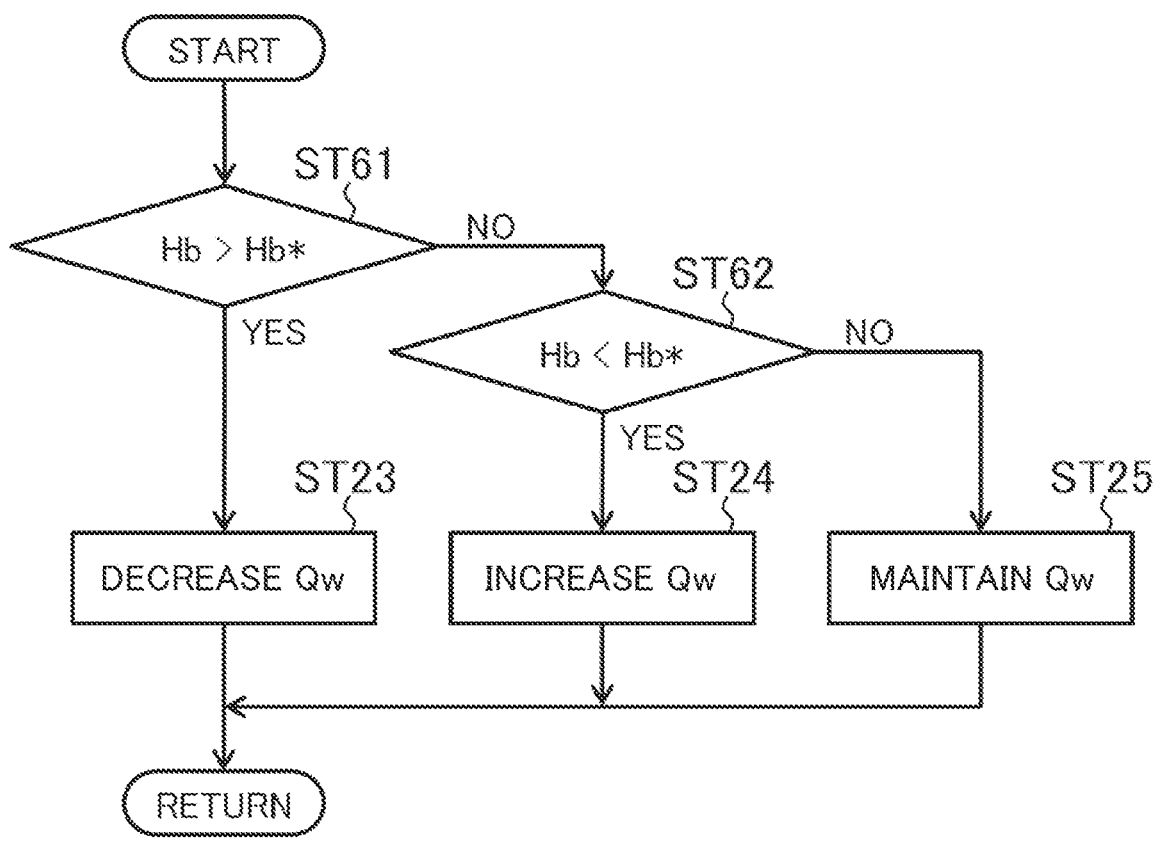
FIG. 16 is a flowchart illustrating second control (flow rate control) in Embodiment 3.

In a case where head control (control of the head (ΔPw) of the water turbine (11)) is performed in second control by the controller (13) in Embodiment 3, steps (ST26, ST27, ST28) illustrated in FIG. 7 are performed instead of steps (ST23, ST24, ST25) illustrated in FIG. 16.

Number-of-Rotations Control

In Embodiment 3, as in Embodiment 1, the controller (13) may be configured to control the number of rotations of the generator (12) instead of controlling the torque of the generator (12), to control the flow rate (Qw) or the head (ΔPw) of the water turbine (11).

Advantages of Embodiment 3

As described above, the hydroelectric power generation system (10) of Embodiment 3 includes the water turbine (11) disposed in the channel (40) through which a fluid flows, the generator (12) driven by the water turbine (11), and the controller (13) that performs first control. The channel (40) includes the first channel (41) located on an inflow side of the water turbine (11). The controller (13) controls, in the first control, the flow rate (Qw) or the head (ΔPw) of the water turbine (11) so that the liquid level (Ha) of the fluid in the first reservoir (50) from which the fluid flows out to the first channel (41) approaches the first target value.

In Embodiment 3, as a result of performing the first control, the liquid level (Ha) of the fluid in the first reservoir (50) from which the fluid flows out to the first channel (41) (an example of a state of the first channel (41)), which is a channel on the inflow side of the water turbine (11), can be managed. For example, the liquid level (Ha) of the fluid in the first reservoir (50) can be managed so that the first reservoir (50) does not become empty.

In the hydroelectric power generation system (10) of Embodiment 3, the controller (13) is capable of performing first control and second control by switching therebetween. The channel (40) includes the first channel (41) and the second channel (42) that is located on an outflow side of the water turbine (11). The controller (13) controls, in the second control, the flow rate (Qw) or the head (ΔPw) of the water turbine (11) so that the liquid level (Hb) of the fluid in the second reservoir (51) into which the fluid flows from the second channel (42) approaches the second target value.

In Embodiment 3, as a result of performing the second control, the liquid level (Hb) of the fluid in the second reservoir (51) into which the fluid flows from the second channel (42) (an example of a state of the second channel (42)), which is a channel on the outflow side of the water turbine (11), can be managed. For example, in a case where the second reservoir (51) is to become empty, switching from first control to second control is performed, and thereby the liquid level (Hb) of the fluid in the second reservoir (51) can be managed so that the second reservoir (51) does not become empty.

In the hydroelectric power generation system (10) of Embodiment 3, the first channel (41) includes the water turbine channel (45) through which at least part of a fluid that is to flow into the water turbine (11) flows, and the branch channel (46) that branches from the water turbine channel (45).

In Embodiment 3, as a result of performing the first control, the liquid level (Ha) of the fluid in the first reservoir (50) from which the fluid flows out to the water turbine channel (45) (an example of a state of the water turbine channel (45) or the branch channel (46)) can be managed.

The hydroelectric power generation system (10) of Embodiment 3 is a hydroelectric power generation system characterized in that the controller (13) is capable of operating by using power obtained by the generator (12).

In Embodiment 3, as a result of operating the controller (13) by using the power obtained by the generator (12), first control can be performed even when a failure occurs in the power system that supplies power to the controller (13).

In Embodiment 3, the channel (40) may have the configuration illustrated in FIG. 8, FIG. 9, or FIG. 10. Specifically, the branch channel (46) may be formed of a plurality of channels, or the branch channel (46) may branch into a plurality of channels. Alternatively, the first channel (41) may be formed of a single channel.

Summarization of Embodiments 1 to 3

As described above, the hydroelectric power generation systems of Embodiments 1 to 3 each include the water turbine (11) disposed in the channel (40) through which a fluid flows, the generator (12) driven by the water turbine (11), and the controller (13) that performs first control. The channel (40) includes the first channel (41) located on an inflow side of the water turbine (11). The controller (13) controls, in the first control, the flow rate (Qw) or the head (ΔPw) of the water turbine (11) so that any one of the pressure (Pa) of the fluid in the first channel (41), the flow rate (Qa) of the fluid in the first channel (41), and the liquid level (Ha) of the fluid in the first reservoir (50) from which the fluid flows out to the first channel (41) approaches a first target value.

In Embodiments 1 to 3, as a result of performing the first control, the state of the first channel (41), which is a channel on the inflow side of the water turbine (11), can be managed.

In the hydroelectric power generation systems (10) of Embodiments 1 to 3, the controller (13) is capable of performing first control and second control by switching therebetween. The channel (40) includes the first channel (41) and the second channel (42) that is located on an outflow side of the water turbine (11). The controller (13) controls, in the second control, the flow rate (Qw) or the head (ΔPw) of the water turbine (11) so that any one of the pressure (Pb) of the fluid in the second channel (42), the flow rate (Qb) of the fluid in the second channel (42), and the liquid level (Hb) of the fluid in the second reservoir (51) into which the fluid flows from the second channel (42) approaches a second target value.

In Embodiments 1 to 3, as a result of performing the second control, the state of the second channel (42), which is a channel on the outflow side of the water turbine (11), can be managed.

In the hydroelectric power generation systems (10) of Embodiments 1 to 3, the first channel (41) includes the water turbine channel (45) through which at least part of a fluid that is to flow into the water turbine (11) flows, and the branch channel (46) that branches from the water turbine channel (45).

In Embodiments 1 to 3, as a result of performing the first control, the state of the water turbine channel (45) or the branch channel (46) can be managed.

In the hydroelectric power generation systems (10) of Embodiments 1 to 3, the controller (13) controls the torque or the number of rotations of the generator (12) to control the flow rate (Qw) or the head (ΔPw) of the water turbine (11).

In the hydroelectric power generation systems (10) of Embodiments 1 to 3, the branch channel (46) is provided with the adjustment mechanism (60) that adjusts the flow rate or pressure of a fluid.

At the time of setting a first target value and a second target value, a predetermined value may be set, a target range may be set, or an upper limit or a lower limit may be set.

Embodiment 4

A hydroelectric power generation system (10) of Embodiment 4 is different from the hydroelectric power generation systems (10) of Embodiments 1 to 3 in the operation of the controller (13). In Embodiment 4, the controller (13) performs first control so that an integrated flow rate of a fluid in the branch channel (46) approaches a target integrated flow rate. Other than this point, the configuration of the hydroelectric power generation system (10) of Embodiment 4 is similar to the configuration of the hydroelectric power generation systems (10) of Embodiments 1 to 3.

Integrated Flow Rate Control

Next, integrated flow rate control by the controller (13) in Embodiment 4 will be described with reference to FIG. 17. In this example, a target integrated flow rate is to be secured in each of control periods (P0).

Figure 17:
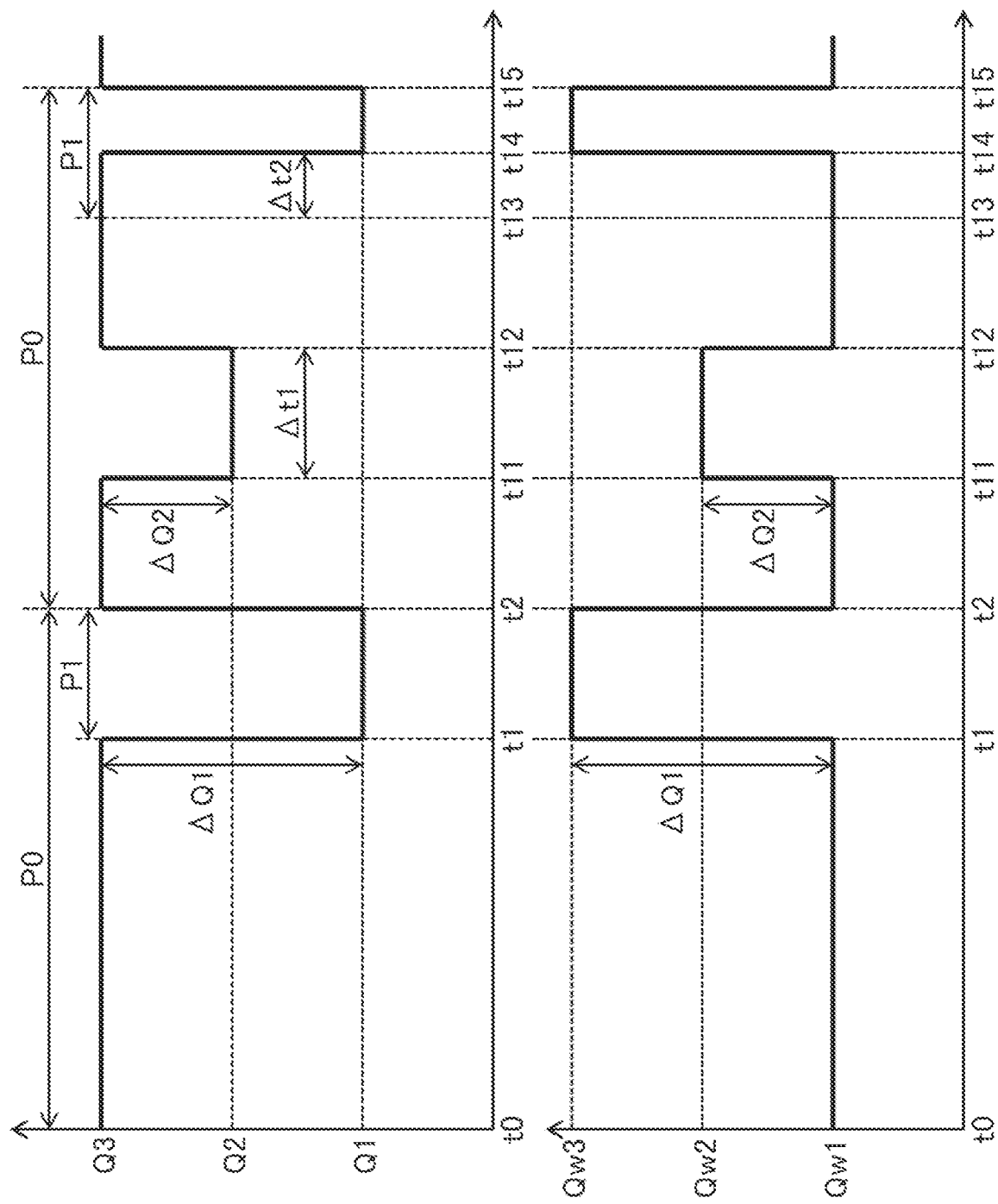
FIG. 17 is a graph illustrating integrated flow rate control of a hydroelectric power generation system according to Embodiment 4.

In FIG. 17, a first branch flow rate (Q1), a second branch flow rate (Q2), and a third branch flow rate (Q3) are each a flow rate of a fluid in the branch channel (46). The second branch flow rate (Q2) is higher than the first branch flow rate (Q1) The third branch flow rate (Q3) is higher than the second branch flow rate (Q2). A first water turbine flow rate (Qw1), a second water turbine flow rate (Qw2), and a third water turbine flow rate (Qw3) are each a flow rate (Qw) of the water turbine (11). The second water turbine flow rate (Qw2) is higher than the first water turbine flow rate (Qw1). The third water turbine flow rate (Qw3) is higher than the second water turbine flow rate (Qw2).

In the example in FIG. 17, the first water turbine flow rate (Qw1) is the same as the first branch flow rate (Q1), the second water turbine flow rate (Qw2) is the same as the second branch flow rate (Q2), and the third water turbine flow rate (Qw3) is the same as the third branch flow rate (Q3). The difference between the first branch flow rate (Q1) and the third branch flow rate (Q3) is a first flow rate difference (ΔQ1). The difference between the second branch flow rate (Q2) and the third branch flow rate (Q3) is a second flow rate difference (ΔQ2). Also, the difference between the first water turbine flow rate (Qw1) and the second water turbine flow rate (Qw2) is the second flow rate difference (ΔQ2). Each control period (P0) includes an adjustment period (P1). The adjustment period (P1) is a period including a terminal point of the control period (P0) The target integrated flow rate is set to Q3×(P0−P1)+Q1 P1.

As illustrated in FIG. 17, during a period from time (t0) to time (t1) in the first control period (P0), the controller (13) performs first control so that the flow rate of the fluid in the branch channel (46) becomes the third branch flow rate (Q3). During the period from time (t0) to time (t1), the flow rate (Qw) of the water turbine (11) is the first water turbine flow rate (Qw1). Subsequently, during a period from time (t1) to time (t2) (the adjustment period (P1)), the controller (13) performs first control so that the flow rate of the fluid in the branch channel (46) becomes the first branch flow rate (Q1). During the period from time (t1) to time (t2), the flow rate (Qw) of the water turbine (11) is the third water turbine flow rate (Qw3). With this control, the target integrated flow rate is secured during the first control period (P0).

Subsequently, during the second control period (P0), the first control is suspended and second control is performed during a period from time (t11) to time (t12). During the period from time (t11) to time (t12), the controller (13) performs second control so that the flow rate (Qw) of the water turbine (11) becomes the second water turbine flow rate (Qw2). Accordingly, during the period from time (t11) to time (t12), the flow rate of the fluid in the branch channel (46) is the second branch flow rate (Q2) lower than the third branch flow rate (Q3). Subsequently, during a period from time (t12) to time (t13), the controller (13) performs first control so that the flow rate of the fluid in the branch channel (46) becomes the third branch flow rate (Q3). Accordingly, the integrated flow rate of the fluid in the branch channel (46) at time (t13) is lower than the target integrated flow rate "Q3×(P0−P1)+Q1×P1" by "ΔQ2×Δt1". A period (Δt1) is a period from time (t11) to time (t12).

At time (t13) in the second control period (P0), the controller (13) obtains a period (Δt2) from the start point of the adjustment period (P1) of the control period (P0) to the time point at which the flow rate of the fluid in the branch channel (46) is changed from the third branch flow rate (Q3) to the first branch flow rate (Q1) so that the following Equation 1 holds.

$$\Delta Q2 \times \Delta t1 = \Delta Q1 \times \Delta t2 \qquad \text{Equation 1}$$

Subsequently, during a period until the period (Δt2) elapses from time (t13) (a period from time (t13) to time (t14)), the controller (13) performs first control so that the flow rate of the fluid in the branch channel (46) is maintained at the third branch flow rate (Q3). In other words, during the adjustment period (P1) of the control period (P0), the controller (13) performs first control so that the flow rate of the fluid in the branch channel (46) is maintained at the third branch flow rate (Q3) during the period corresponding to a shortage in the target integrated flow rate. With this control, the target integrated flow rate is secured during the second control period (P0).

For example, it is assumed that, in a place adaptable to an operation of increasing the flow rate of the fluid in the branch channel (46) in the morning, daytime, and night and increasing the flow rate (Qw) of the water turbine (11) during midnight hours, a contract is made in which a fluid is supplied to the branch channel (46) so that the integrated flow rate per day of the fluid in the branch channel (46) is constant. In such a place, if the liquid level of the fluid in the second reservoir (51) located on the outflow side of the water turbine (11) suddenly decreases in the daytime, it is necessary to temporarily increase the flow rate (Qw) of the water turbine (11) even in the daytime. The temporary increase in the flow rate (Qw) of the water turbine (11) in the daytime may cause a shortage in the integrated flow rate per day of the fluid in the branch channel (46). Accordingly, the above-described integrated flow rate control makes it possible to secure the integrated flow rate per day of the fluid in the branch channel (46) even if the flow rate (Qw) of the water turbine (11) is temporarily increased in the daytime.

Advantages of Embodiment 4

As described above, in the hydroelectric power generation system (10) of Embodiment 4, the controller (13) performs first control so that an integrated flow rate of a fluid in the branch channel (46) approaches a target integrated flow rate.

In Embodiment 4, the integrated flow rate of the fluid in the branch channel (46) can be managed.

Modification of Adjustment Mechanism

Figure 18:
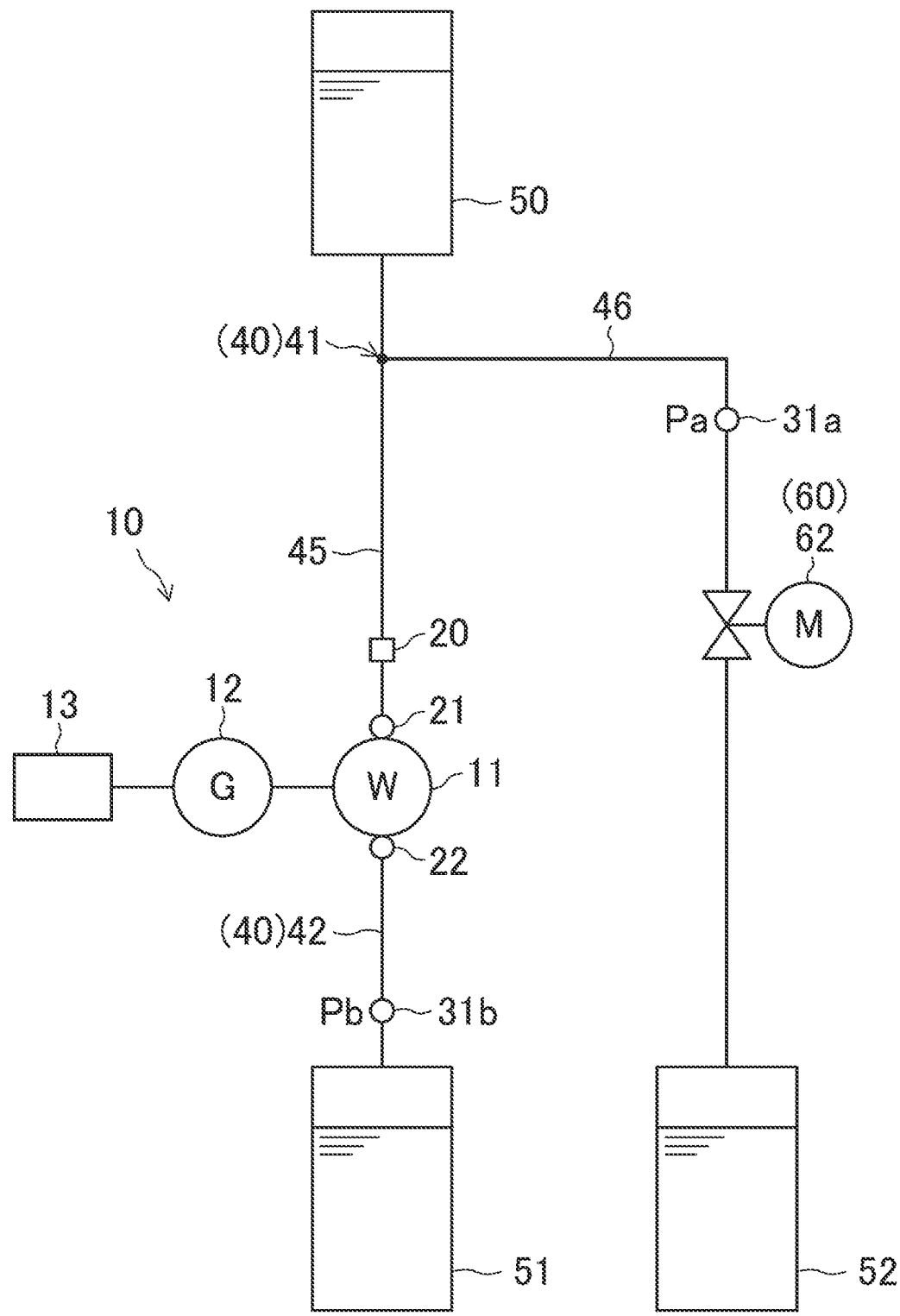
FIG. 18 is a diagram illustrating a modification of an adjustment mechanism.

As illustrated in FIG. 18, an electric valve (62) or a decompression valve may be provided as the adjustment mechanism (60).

In a case where the electric valve (62) is provided as the adjustment mechanism (60), the controllability of the electric valve (62) can be increased by performing first control (specifically, by controlling the flow rate (Qw) or the head (ΔPw) of the water turbine (11) so that the pressure of a fluid near the inlet of the electric valve (62) approaches a first target value).

Ina case where cavitation is likely to occur in the electric valve (62), the occurrence of cavitation in the electric valve (62) can be avoided by decreasing the pressure of the fluid near the inlet of the electric valve (62) by first control. Accordingly, a low-cost (low-performance) electric valve can be used as the electric valve (62). In addition, the life of the electric valve (62) can be extended.

Cavitation is a phenomenon which results from acceleration of the fluid in the water turbine (11) and in which the pressure of the fluid decreases to approach a saturated vapor pressure and many vapor bubbles are generated (cavity phenomenon). The occurrence of cavitation causes many vapor bubbles to be generated. When these vapor bubbles disappear, a very high pressure such as tens of thousands of atmospheres is locally generated. This leads to a trouble, such as degradation of the performance of the water turbine (11), erosion of the surface of the water turbine (11), or the occurrence of vibration or noise.

Modifications of Controller

Next, modifications of the controller (13) will be described with reference to FIG. 19 and FIG. 20. The controller (13) may be configured to estimate the pressure (Pa) of the fluid in the first channel (41), the flow rate (Qa) of the fluid in the first channel (41), or the liquid level (Ha) of the fluid in the first reservoir (50).

Figure 19:
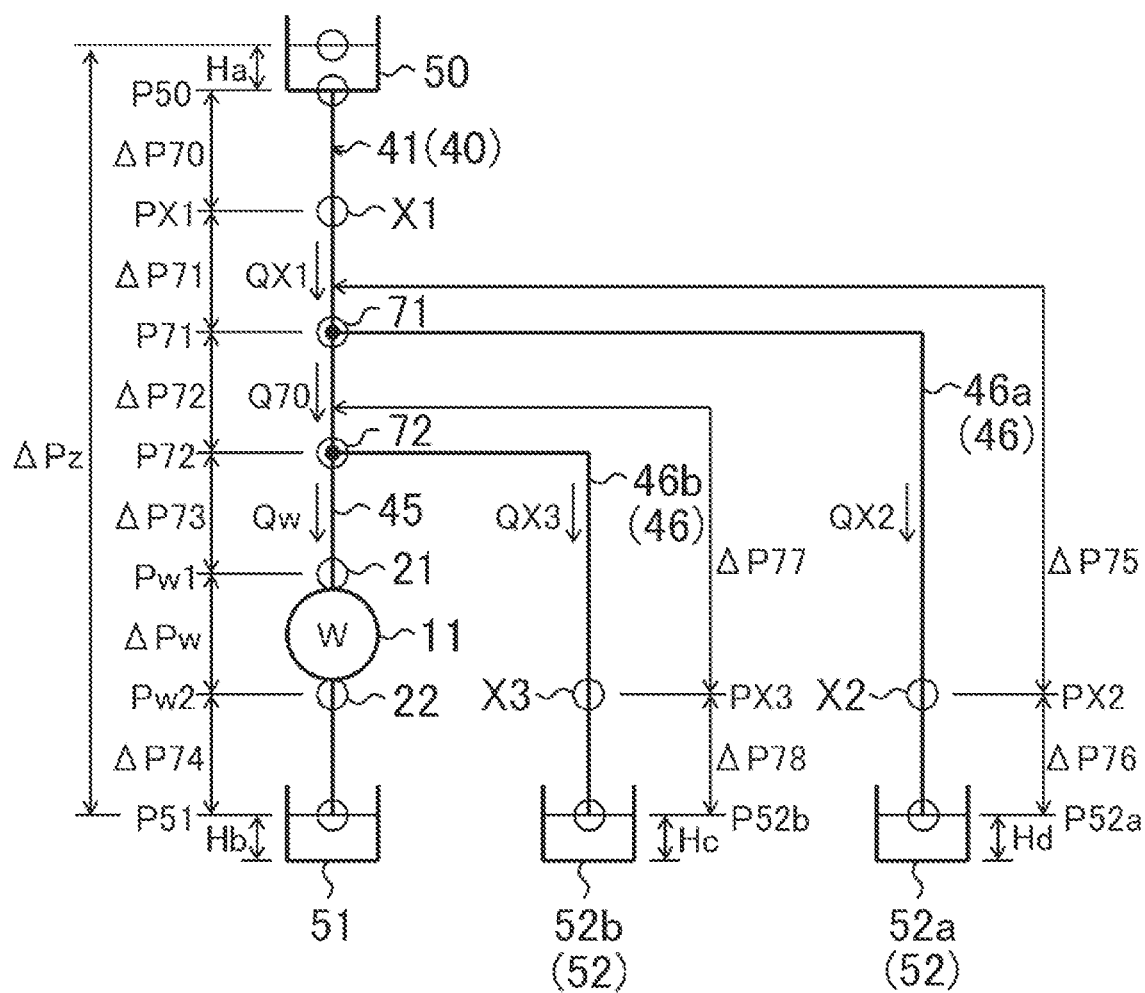
FIG. 19 is a diagram for describing estimation of a pressure, a flow rate, and a liquid level.

In the example in FIG. 19, the first channel (41) is formed of the water turbine channel (45), the first branch channel (46a), and the second branch channel (46b). Hereinafter, the branch reservoir (52) connected to the outlet of the first branch channel (46a) is referred to as a "first branch reservoir (52a)", and the branch reservoir (52) connected to the outlet of the second branch channel (46b) is referred to as a "second branch reservoir (52b)".

In the example in FIG. 19, a first connection point (71) is a connection point between the water turbine channel (45) and the first branch channel (46a). A second connection point (72) is a connection point between the water turbine channel (45) and the second branch channel (46b). A first point (X1) is a point located between the first reservoir (50) and the first connection point (71) on the water turbine channel (45). A second point (X2) is a point located on the first branch channel (46a). A third point (X3) is a point located on the second branch channel (46b).

A pressure (P50) is the pressure of a fluid in the first reservoir (50). A pressure (PX1) is the pressure of a fluid at the first point (X1). A pressure (P71) is the pressure of a fluid at the first connection point (71). A pressure (P72) is the pressure of a fluid at the second connection point (72). A pressure (P51) is the pressure of a fluid in the second reservoir (51).

A pressure difference (ΔP70) is the pressure difference of a fluid between the first reservoir (50) and the first point (X1) in the water turbine channel (45). A pressure difference (ΔP71) is the pressure difference of a fluid between the first point (X1) and the first connection point (71) in the water turbine channel (45). A pressure difference (ΔP72) is the pressure difference of a fluid between the first connection point (71) and the second connection point (72) in the water turbine channel (45). A pressure difference (ΔP73) is the pressure difference of a fluid between the second connection point (72) and the water turbine (11) in the water turbine channel (45). A pressure difference (ΔP74) is the pressure difference of a fluid between the water turbine (11) and the second reservoir (51) in the water turbine channel (45).

A pressure (PX2) is the pressure of a fluid at the second point (X2). A pressure (P52a) is the pressure of a fluid in the first branch reservoir (52a). A pressure difference (ΔP75) is the pressure difference of a fluid between the first connection point (71) and the second point (X2) in the first branch channel (46a). A pressure difference (ΔP76) is the pressure difference of a fluid between the second point (X2) and the first branch reservoir (52a) in the first branch channel (46a). A liquid level (Hd) is the liquid level of a fluid in the first branch reservoir (52a).

A pressure (PX3) is the pressure of a fluid at the third point (X3). A pressure (P52b) is the pressure of a fluid in the second branch reservoir (52b). A pressure difference (ΔP77) is the pressure difference of a fluid between the second connection point (72) and the third point (X3) in the second branch channel (46b). A pressure difference (ΔP78) is the pressure difference of a fluid between the third point (X3) and the second branch reservoir (52b) in the second branch channel (46b). A liquid level (Hc) is the liquid level of a fluid in the second branch reservoir (52b).

A flow rate (QX1) is the flow rate of a fluid between the first reservoir (50) and the first connection point (71) in the water turbine channel (45), and is the flow rate of a fluid flowing through the first point (X1). A flow rate (Q70) is the flow rate of a fluid between the first connection point (71) and the second connection point (72) in the water turbine channel (45). A flow rate (QX2) is the flow rate of a fluid in the first branch channel (46a), and is the flow rate of a fluid flowing through the second point (X2). A flow rate (QX3) is the flow rate of a fluid in the second branch channel (46b), and is the flow rate of a fluid flowing through the third point (X3). The flow rate (Q70) corresponds to the sum of the flow rate (Qw) of the water turbine (11) and the flow rate (QX3) of the fluid in the second branch channel (46b). The flow rate (QX1) corresponds to the sum of the flow rate (Q70) and the flow rate (QX2) of the fluid in the first branch channel (46a).

With use of the characteristic map of the water turbine (11) (see FIG. 3), the flow rate (Qw) and the head (ΔPw) of the water turbine (11) can be estimated from the torque or the number of rotations of the generator (12).

With use of a Darcy-Weisbach equation or a Hazen-Williams equation, the pressure difference (head) of a fluid between two points can be estimated from the flow rate of the fluid flowing through a channel between the two points and a channel condition (the length, cross section, or the like of the channel) between the two points. For example, in the example in FIG. 19, the pressure difference (ΔP71) can be estimated on the basis of the flow rate (QX1) and a channel condition between the first point (X1) and the first connection point (71).

With use of a Darcy-Weisbach equation, a Hazen-Williams equation, or the Bernoulli theorem, the flow rate of a fluid flowing through a channel between two points can be estimated from the pressure difference (head) of the fluid between the two points and a channel condition (the length, cross section, or the like of the channel) between the two points. For example, in the example in FIG. 19, the flow rate (QX1) can be estimated on the basis of the pressure difference (ΔP71) and a channel condition between the first point (X1) and the first connection point (71).

In the example in FIG. 19, in a case where the second reservoir (51) is exposed to the atmosphere, the pressure (P51) of the fluid in the second reservoir (51) is zero. The pressure difference (ΔP74) between the water turbine (11) and the second reservoir (51) can be estimated from the liquid level (Hb) of the fluid in the second reservoir (51), a channel condition between the water turbine (11) and the second reservoir (51), and the flow rate (Qw) of the water turbine (11). In a case where the liquid level (Hb) is fixed, the pressure difference (ΔP74) can be estimated from a channel condition between the water turbine (11) and the second reservoir (51), and the flow rate (Qw) of the water turbine (11). In such a case where the liquid level (Hb) is fixed, the liquid level sensor for measuring the liquid level (Hb) can be omitted. Things similar to those of the second reservoir (51) can be applied to the first branch reservoir (52a) and the second branch reservoir (52b). The pressure (P50) of the fluid in the first reservoir (50) can be estimated from the liquid level (Ha) of the fluid in the first reservoir (50).

In a case where a pressure sensor for measuring the pressure of a fluid is provided in the water turbine channel (45) of the first channel (41) or the second channel (42), it is preferable that, from the viewpoint of reducing an installation cost, the pressure sensor be provided near the inlet or the outlet of the water turbine (11). It is more preferable that, from the viewpoint of reducing an installation cost, the pressure sensor be provided in the second channel (42) than in the first channel (41).

Modification 1 of Controller: Estimation of Pressure of Fluid

The controller (13) may be configured to estimate the pressure (Pa) of the fluid in the first channel (41) on the basis of the pressure of a fluid at a certain point included in the channel (40), a channel condition between the certain point and an estimation target point which is different from the certain point and at which the pressure (Pa) of the fluid in the first channel (41) is to be estimated, and the flow rate of a fluid in a channel between the certain point and the estimation target point.

For example, under the assumption that the pressure to be estimated as the pressure (Pa) of the fluid in the first channel (41) is "the pressure (PX1) at the first point (X1)", in a case where the pressure (Pw1) near the inlet of the water turbine (11), the flow rate (Qw) of the water turbine (11), the flow rate (Q70) between the first connection point (71) and the second connection point (72), and the flow rate (QX1) between the first reservoir (50) and the first connection point (71) are measured (or estimated), the pressure (PX1) at the first point (X1) can be estimated by using the following Equation 2.

$$PX1 = Pw1 + \Delta P73 + \Delta P72 + \Delta P71 \quad \text{Equation 2}$$

The pressure difference (ΔP73) is estimated from the flow rate (Qw) of the water turbine (11) and a channel condition between the second connection point (72) and the water turbine (11). The pressure difference (ΔP72) is estimated from the flow rate (Q70) and a channel condition between the first connection point (71) and the second connection point (72). The pressure difference (ΔP71) is estimated from the flow rate (QX1) and a channel condition between the first point (X1) and the first connection point (71). In the above example, the estimation target point at which the pressure (Pa) of the fluid in the first channel (41) is to be estimated is the "first point (X1)", and the certain point included in the channel (40) is a "point near the inlet of the water turbine (11)".

Under the assumption that the pressure to be estimated as the pressure (Pa) of the fluid in the first channel (41) is "the pressure (PX1) at the first point (X)", in a case where the second reservoir (51) is exposed to the atmosphere, and the liquid level (Hb) of the second reservoir (51), the flow rate (Qw) and the head (ΔPw) of the water turbine (11), the flow rate (Q70) between the first connection point (71) and the second connection point (72), and the flow rate (QX1) between the first reservoir (50) and the first connection point (71) are measured (or estimated), the pressure (PX1) at the first point (X1) can be estimated by using the following Equation 3.

$$PX1 = P51 + \Delta P74 + \Delta Pw + \Delta P73 + \Delta P72 + \Delta P71 \quad \text{Equation 3}$$

The pressure (P51) of the second reservoir (51) is zero. The pressure difference (ΔP74) is estimated from the liquid level (Hb) of the second reservoir (51), the flow rate (Qw) of the water turbine (11), and a channel condition between the water turbine (11) and the second reservoir (51). The pressure difference (ΔP73) is estimated from the flow rate (Qw) of the water turbine (11) and a channel condition between the second connection point (72) and the water turbine (11). The pressure difference (ΔP72) is estimated from the flow rate (Q70) and a channel condition between the first connection point (71) and the second connection point (72). The pressure difference (ΔP71) is estimated from the flow rate (QX1) and a channel condition between the first point (X1) and the first connection point (71). In the above example, the estimation target point at which the pressure (Pa) of the fluid in the first channel (41) is to be estimated is the "first point (X1)", and the certain point included in the channel (40) is the "point of the second reservoir (51)".

Under the assumption that the pressure to be estimated as the pressure (Pa) of the fluid in the first channel (41) is "the pressure (PX3) at the third point (X3)", in a case where the pressure (Pw2) near the outlet of the water turbine (11), the flow rate (Qw) and the head (ΔPw) of the water turbine (11), and the flow rate (QX3) of the second branch channel (46b) are measured (or estimated), the pressure (PX3) at the third point (X3) can be estimated by using the following Equation 4.

$$PX3 = Pw2 + \Delta Pw + \Delta P73 - \Delta P77 \quad \text{Equation 4}$$

The pressure difference (ΔP73) is estimated from the flow rate (Qw) of the water turbine (11) and a channel condition between the second connection point (72) and the water turbine (11). The pressure difference (ΔP77) is estimated from the flow rate (QX3) and a channel condition between the second connection point (72) and the third point (X3). In the above example, the estimation target point at which the pressure (Pa) of the fluid in the first channel (41) is to be estimated is the "third point (X3)", and the certain point included in the channel (40) is a "point near the outlet of the water turbine (11)".

Also in the configuration of the channel (40) illustrated in FIG. 1 and the configuration of the channel (40) illustrated in FIG. 10, the pressure (Pa) of the fluid in the first channel (41) can be estimated by a procedure similar to that described above.

Advantages of Modification 1 of Controller

As described above, in Modification 1, the controller (13) estimates the pressure (Pa) of the fluid in the first channel (41) on the basis of the pressure of the fluid at a certain point included in the channel (40), a channel condition between the certain point and an estimation target point which is different from the certain point and at which the pressure (Pa) of the fluid in the first channel (41) is to be estimated, and the flow rate of the fluid in a channel between the certain point and the estimation target point.

In Modification 1, it is not necessary to provide a pressure sensor that detects the pressure (Pa) of the fluid in the first channel (41), and thus an installation cost can be reduced.

Modification 2 of Controller: Estimation of Flow Rate of Fluid

The controller (13) may be configured to estimate the flow rate (Qa) of the fluid in the first channel (41) on the basis of the flow rate of the fluid at a certain point different from the estimation target point at which the flow rate (Qa) of the fluid in the first channel (41) is to be estimated. Alternatively, the controller (13) may be configured to estimate the flow rate (Qa) of the fluid in the first channel (41) on the basis of the pressure of the fluid at the estimation target point at which the flow rate (Qa) of the fluid in the first channel (41) is to be estimated, the pressure of the fluid at a certain point different from the estimation target point, and a channel condition between the estimation target point and the certain point.

For example, under the assumption that the flow rate to be estimated as the flow rate (Qa) of the fluid in the first channel (41) is "the flow rate (QX2) at the second point (X2)", in a case where the flow rate (QX1) between the first reservoir (50) and the first connection point (71), the flow rate (Qw) of the water turbine (11), and the flow rate (QX3) of the second branch channel (46b) are measured (or estimated), the flow rate (QX2) at the second point (X2) can be estimated by using the following Equation 5.

$$QX2 = QX1 - (Qw + QX3) \quad \text{Equation 5}$$

In the above example, the estimation target point at which the flow rate (Qa) of the fluid in the first channel (41) is to be estimated is the "second point (X2)", and the certain point different from the estimation target point includes a "certain point between the first reservoir (50) and the first connection point (71)", a "point at which the water turbine (11) is disposed", and a "certain point of the second branch channel (46b)".

Under the assumption that the flow rate to be estimated as the flow rate (Qa) of the fluid in the first channel (41) is "the flow rate (QX3) at the third point (X3)", in a case where the pressure (Pw1) near the inlet of the water turbine (11), the flow rate (Qw) of the water turbine (11), and the pressure (PX3) at the third point (X3) are measured (or estimated), the pressure difference (ΔP77) between the second connection point (72) and the third point (X3) is estimated by using the following Equation 6.

$$\Delta P77 = (Pw1 + \Delta P73) - PX3 \quad \text{Equation 6}$$

The pressure difference (ΔP73) is estimated from the flow rate (Qw) of the water turbine (11) and a channel condition between the second connection point (72) and the water turbine (11). "Pw1+ΔP73" corresponds to the pressure (P72) at the second connection point (72). The flow rate (QX3) at the third point (X3) can be estimated from the pressure difference (ΔP77) between the second connection point (72) and the third point (X3) and a channel condition between the second connection point (72) and the third point (X3). In the above example, the estimation target point at which the flow rate (Qa) of the fluid in the first channel (41) is to be estimated is the "third point (X3)", and the certain point different from the estimation target point is the "second connection point (72)".

Also in the configuration of the channel (40) illustrated in FIG. 1 and the configuration of the channel (40) illustrated in FIG. 10, the flow rate (Qa) of the fluid in the first channel (41) can be estimated by a procedure similar to that described above.

Advantages of Modification 2 of Controller

As described above, in Modification 2, the controller (13) estimates the flow rate (Qa) of the fluid in the first channel (41) on the basis of the flow rate of the fluid at a certain point different from the estimation target point at which the flow rate (Qa) of the fluid in the first channel (41) is to be estimated. Alternatively, the controller (13) estimates the flow rate (Qa) of the fluid in the first channel (41) on the basis of the pressure of the fluid at the estimation target point at which the flow rate (Qa) of the fluid in the first channel (41) is to be estimated, the pressure of the fluid at a certain point different from the estimation target point, and a channel condition between the estimation target point and the certain point.

In Modification 2, it is not necessary to provide a flow rate sensor that detects the flow rate (Qa) of the fluid in the first channel (41), and thus an installation cost can be reduced.

Modification 3 of Controller: Estimation of Liquid Level of Fluid in First Reservoir The controller (13) may be configured to estimate the liquid level (Ha) of the fluid in the first reservoir (50) on the basis of pressures that are based on different flow rates of the fluid at a certain point located between the first reservoir (50) and the water turbine (11) in the channel (40).

Figure 20:
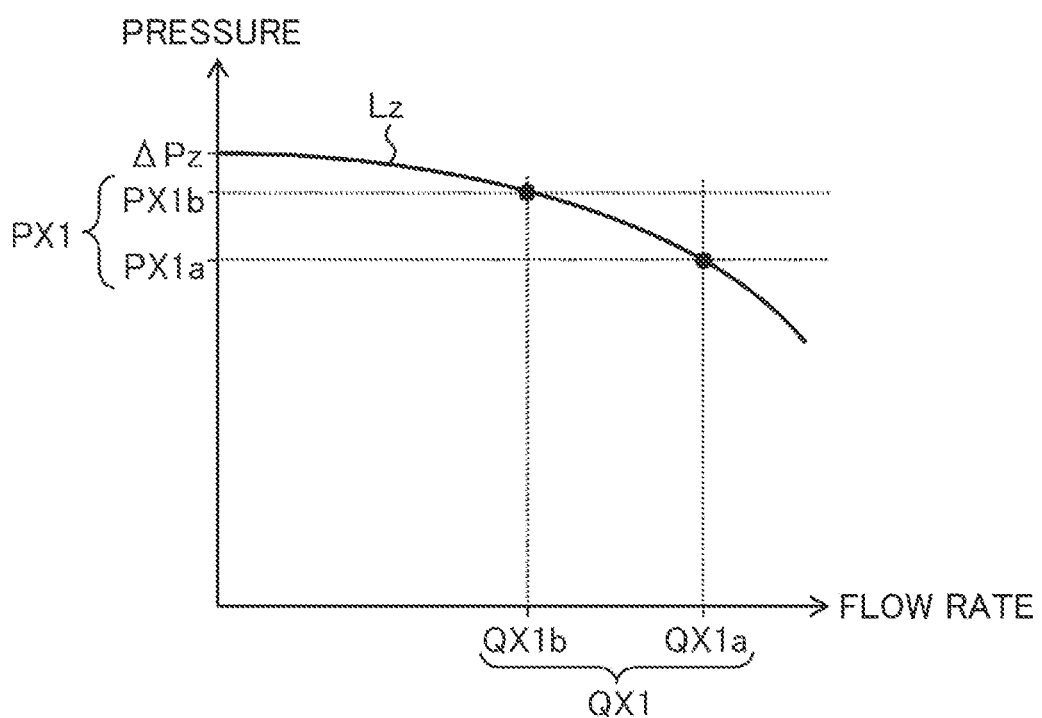
FIG. 20 is a graph for describing estimation of a liquid level.

As illustrated in FIG. 20, a loss curve (Lz) can be estimated on the basis of a change in the pressure (PX1) that is based on a change in the flow rate (QX1) of the fluid at the first point (X1). Specifically, the loss curve (Lz) can be drawn on the basis of a first pressure (PX1a), which is the pressure (PX1) of the fluid when the flow rate (QX1) of the fluid at the first point (X1) is a first flow rate (QX1a), and a second pressure (PX1b), which is the pressure (PX1) of the fluid when the flow rate (QX1) of the fluid at the first point (X1) is a second flow rate (QX1b). Here, the first flow rate (QX1a) and the second flow rate (QX1b) may be, for example, flow rates obtained as a result of a change in the liquid level (Ha) of the fluid in the first reservoir (50) or flow rates obtained as a result of a certain change in flow rate. In the loss curve (Lz), the pressure when the flow rate (QX1) is zero corresponds to the total head (ΔPz). Here, the total head independent of the liquid level (Ha) of the fluid in the first reservoir (50) and the liquid level (Hb) of the fluid in the second reservoir (51) is a "reference total head (ΔPz0)", and then the liquid level (Ha) of the fluid in the first reservoir (50) is expressed by the following Equation 7.

$$Ha = \Delta Pz - \Delta Pz0 + Hb \qquad \text{Equation 7}$$

The reference total head (ΔPz0) can be estimated from a channel condition between the first reservoir (50) and the second reservoir (51).

Specifically, the loss curve (Lz) can be estimated from a change in the flow rate (QX1) at the first point (X1) and a change in the pressure (PX1) at the first point (X1), and the total head (ΔPz) can be estimated from the loss curve (Lz). The liquid level (Ha) of the first reservoir (50) can be estimated from the total head (ΔPz), the reference total head (ΔPz0), and the liquid level (Hb) of the second reservoir (51). In the above example, the certain point located between the first reservoir (50) and the water turbine (11) in the channel (40) is the "first point (X1)".

The pressure (PX1) of the fluid at the first point (X1) may be estimated by a procedure similar to that of Modification 1 of the controller. The flow rate (QX1) of the fluid at the first point (X1) may be estimated by a procedure similar to that of Modification 2 of the controller.

Also in the configuration of the channel (40) illustrated in FIG. 1 and the configuration of the channel (40) illustrated in FIG. 10, the liquid level (Ha) of the fluid in the first reservoir (50) can be estimated by a procedure similar to that described above.

Advantages of Modification 3 of Controller

As described above, in Modification 3, the controller (13) estimates the liquid level (Ha) of the fluid in the first reservoir (50) on the basis of pressures that are based on different flow rates of the fluid at a certain point located between the first reservoir (50) and the water turbine (11) in the channel (40).

In Modification 3, it is not necessary to provide a liquid level sensor that detects the liquid level (Ha) of the fluid in the first reservoir (50), and thus an installation cost can be reduced.

OTHER EMBODIMENTS

The water turbine (11) has better responsivity than an electric valve. Thus, when a sudden change occurs in the pressure (Pa) of the fluid in the first channel (41) (or the flow rate (Qa) of the fluid in the first channel (41) or the liquid level (Ha) of the fluid in the first reservoir (50) from which the fluid flows out to the first channel (41)), the water turbine (11) is capable of quickly responding to the sudden change. Accordingly, a sudden change in the pressure (Pa) of the fluid in the first channel (41) (or the flow rate (Qa) of the fluid in the first channel (41) or the liquid level (Ha) of the fluid in the first reservoir (50) from which the fluid flows out to the first channel (41)) can be suppressed more than in the case of performing control using an electric valve.

Similar control can be performed also by replacing the water turbine (11) with a series or parallel configuration of a water turbine and an electric valve.

The embodiments and modifications have been described above. It is to be understood that the embodiments and the details can be variously changed without deviating from the gist and scope of the claims. The above embodiments and modifications may be combined or replaced as appropriate as long as target functions of the present disclosure are not impaired.

As described above, the present disclosure is useful as a hydroelectric power generation system.

The invention claimed is:
1. A hydroelectric power generation system comprising:
a water turbine disposed in a channel configured to carry a flow of a fluid therethrough;

a generator configured to be driven by the water turbine; and a controller configured to perform a first control, the channel including a first channel located on an inflow side of the water turbine, the first channel including a water turbine channel through which at least part of the fluid that is to flow into the water turbine flows, and a branch channel that branches from the water turbine channel, an outlet of the branch channel being connected to a branch reservoir, the outlet of the branch channel not being connected to a downstream side of the water turbine, and the controller being configured to control, in the first control, a flow rate or a head of the water turbine so that any one of a pressure of the fluid in the first channel, a flow rate of the fluid in the first channel, and a liquid level of the fluid in a first reservoir from which the fluid flows out to the first channel approaches a first target value.

2. The hydroelectric power generation system according to claim 1, wherein the controller is configured to control a torque or a number of rotations of the generator to control the flow rate or the head of the water turbine.

3. The hydroelectric power generation system according to claim 1, wherein the controller is capable of performing the first control and a second control, the channel includes the first channel and a second channel located on an outflow side of the water turbine, and the controller is configured to control, in the second control, the flow rate or the head of the water turbine so that any one of a pressure of the fluid in the second channel, a flow rate of the fluid in the second channel, and a liquid level of the fluid in a second reservoir into which the fluid flows from the second channel approaches a second target value.

4. The hydroelectric power generation system according to claim 1, wherein the controller is configured to perform the first control so that an integrated flow rate of the fluid in the branch channel approaches a target integrated flow rate.

5. The hydroelectric power generation system according to claim 1, wherein the branch channel is provided with an adjustment mechanism configured to adjust a flow rate or a pressure of the fluid.

6. The hydroelectric power generation system according to claim 5, wherein the controller is configured to control, in the first control, the flow rate or the head of the water turbine so that a pressure of the fluid near an inlet of the adjustment mechanism approaches the first target value.

7. The hydroelectric power generation system according to claim 1, wherein the controller is configured to estimate the pressure of the fluid in the first channel based on a pressure of the fluid at a certain point included in the channel, a channel condition between the certain point and an estimation target point different from the certain point and at which the pressure of the fluid in the first channel is to be estimated, and a flow rate of the fluid in a channel between the certain point and the estimation target point.

8. The hydroelectric power generation system according to claim 1, wherein the controller is configured to estimate the liquid level of the fluid in the first reservoir based on pressures that are based on different flow rates of the fluid at a certain point located between the first reservoir and the water turbine in the channel.

9. The hydroelectric power generation system according to claim 1, wherein the controller is configured to estimate the flow rate of the fluid in the first channel based on a flow rate of the fluid at a certain point different from an estimation target point at which the flow rate of the fluid in the first channel is to be estimated.

10. The hydroelectric power generation system according to claim 1, wherein the controller is configured to estimate the flow rate of the fluid in the first channel based on a pressure of the fluid at an estimation target point at which the flow rate of the fluid in the first channel is to be estimated, a pressure of the fluid at a certain point different from the estimation target point, and a channel condition between the estimation target point and the certain point.

11. The hydroelectric power generation system according to claim 1, wherein the controller is capable of operating by using power obtained by the generator.

12. A hydroelectric power generation system comprising:

a water turbine disposed in a channel configured to carry a flow of a fluid therethrough;

a generator configured to be driven by the water turbine; and a controller configured to perform a first control, the channel including a first channel located on an inflow side of the water turbine, and the controller being configured to control, n the first control, a flow rate or a head of the water turbine so that any one of a pressure of the fluid in the first channel, a flow rate of the fluid in the first channel, and a liquid level of the fluid in a first reservoir from which the fluid flows out to the first channel approaches a first target value, the first channel including a water turbine channel configured to carry flow of at least part of the fluid that is to flow into the water turbine therethrough, and a branch channel that branches from the water turbine channel, and the controller being further configured to perform the first control so that an integrated flow rate of the fluid in the branch channel approaches a target integrated flow rate.

13. A hydroelectric power generation system comprising:

a water turbine disposed in a channel configured to carry a flow of a fluid therethrough;

a generator configured to be driven by the water turbine; and a controller configured to perform a first control, the channel including a first channel located on an inflow side of the water turbine, and the controller being configured to control, in the first control, a flow rate or a head of the water turbine so that any one of a pressure of the fluid in the first channel,
a flow rate of the fluid in the first channel, and
a liquid level of the fluid in a first reservoir from which the fluid flows out to the first channel
approaches a first target value,
the first channel including
a water turbine channel configured to carry flow of at least part of the fluid that is to flow into the water turbine therethrough, and
a branch channel that branches from the water turbine channel,
the branch channel being provided with an adjustment mechanism configured to adjust a flow rate or a pressure of the fluid, and
the controller being further configured to control, in the first control, the flow rate or the head of the water turbine so that a pressure of the fluid near an inlet of the adjustment mechanism approaches the first target value.

* * * * *